US012696059B2

(12) United States Patent
Pateromichelakis et al.

(10) Patent No.: US 12,696,059 B2
(45) Date of Patent: Jul. 28, 2026

(54) RE-MAPPING A NETWORK PROFILE

(71) Applicant: Lenovo (Singapore) Pte. Ltd., New Tech Park (SG)

(72) Inventors: Emmanouil Pateromichelakis, Viersen (DE); Genadi Velev, Darmstadt (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 384 days.

(21) Appl. No.: 18/016,542

(22) PCT Filed: Jul. 14, 2020

(86) PCT No.: PCT/EP2020/069904
§ 371 (c)(1),
(2) Date: Jan. 17, 2023

(87) PCT Pub. No.: WO2022/012743
PCT Pub. Date: Jan. 20, 2022

(65) Prior Publication Data
US 2023/0319528 A1    Oct. 5, 2023

(51) Int. Cl.
*H04W 48/18*          (2009.01)
*H04W 4/44*           (2018.01)

(52) U.S. Cl.
CPC ............. *H04W 4/44* (2018.02); *H04W 48/18* (2013.01)

(58) Field of Classification Search
CPC ... H04W 4/44; H04W 48/18; H04W 28/0263; H04W 24/02; H04W 4/40
See application file for complete search history.

(56) References Cited

U.S. PATENT DOCUMENTS

2018/0359337 A1*  12/2018  Kodaypak ........... H04L 12/1886
2019/0342937 A1   11/2019  Salkintzis
(Continued)

FOREIGN PATENT DOCUMENTS

WO      2018215076 A1   11/2018
WO      2020092742 A1   5/2020

OTHER PUBLICATIONS

PCT/EP2020/069904, "Notification of Transmittal of the International Search Report and the Written Opinion of the International Searching Authority, or the Declaration", International Searching Authority, Mar. 26, 2021, pp. 1-15.
(Continued)

*Primary Examiner* — Marcus Hammonds
(74) *Attorney, Agent, or Firm* — Kunzler Needham & Hilton

(57) ABSTRACT

Apparatuses, methods, and systems are disclosed for network profile re-mapping for an application supporting one or more UEs. One apparatus includes a processor that configures a first mapping of a first application to a first network profile based on at least one application requirement of the first application. The processor receives a trigger event report from the first application for adapting the at least one application requirement for at least one UE of the first application. The processor determines, based on the trigger event report, a second mapping of the first application to a second network profile. The apparatus includes a transceiver that transmits the second mapping of the first application to the at least one UE of the first application.

20 Claims, 12 Drawing Sheets

(56)        References Cited

U.S. PATENT DOCUMENTS

| 2020/0177687 | A1 |  | 6/2020 | Kodaypak et al. | |
| 2022/0240173 | A1 | * | 7/2022 | Wang | H04W 48/18 |
| 2022/0369221 | A1 | * | 11/2022 | Pateromichelakis | |
| | | | | | H04L 41/0806 |
| 2023/0052699 | A1 | * | 2/2023 | Ninglekhu | H04W 60/04 |

OTHER PUBLICATIONS

3GPP, "3rd Generation Partnership Project; Technical Specification Group Services and System Aspects; Study on application layer support for Factories of the Future in 5G network; (Release 17)", 3GPP TR 23.745 V0.8.0, May 2020, pp. 1-36.

3GPP, "3rd Generation Partnership Project; Technical Specification Group Services and System Aspects; Study on application architecture for enabling Edge Applications; (Release 17)", 3GPP TR 23.758 V17.0.0, Dec. 2019, pp. 1-113.

3GPP, "3rd Generation Partnership Project; Technical Specification Group Services and System Aspects; Study on enhancements to application layer support for V2X services; (Release 17)", 3GPP TR 23.764 V1.0.0, Jun. 2020, pp. 1-35.

3GPP, "3rd Generation Partnership Project; Technical Specification Group Services and System Aspects; Study on architecture enhancements for EPS and 5G System to support advanced V2X services (Release 16)", 3GPP TR 23.786 V1.1.0, Jan. 2019, pp. 1-111.

3GPP, "3rd Generation Partnership Project; Technical Specification Group Services and System Aspects; Study on application layer support for V2X services; (Release 16)", 3GPP TR 23.795 V16.1.0, Dec. 2018, pp. 1-77.

3GPP, "3rd Generation Partnership Project; Technical Specification Group Services and System Aspects; Service requirements for cyber-physical control applications in vertical domains; Stage 1 (Release 17)", 3GPP TS 22.104 V17.2.0, Dec. 2019, pp. 1-76.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Policy and charging control framework for the 5G System (5GS); Stage 2 (Release 16)", 3GPP TS 23.503 V16.4.1, Apr. 2020, pp. 1-115.

3GPP, "3rd Generation Partnership Project; Technical Specification Group Services and System Aspects; Architecture for enabling Edge Applications; (Release 17)", 3GPP TS 23.558 V0.3.0, Jun. 2020, pp. 1-70.

3GPP, "3rd Generation Partnership Project; Technical Specification Group Services and System Aspects; Management and orchestration; Concepts, use cases and requirements (Release 16)", 3GPP TS 28.530 V16.1.0, Dec. 2019, pp. 1-30.

3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, pp. 1-133.

* cited by examiner

RE-MAPPING A NETWORK PROFILE

FIELD

The subject matter disclosed herein relates generally to wireless communications and more particularly relates to middleware-assisted slice and/or DNN re-mapping for vertical applications, for example providing network profile re-mapping for an application supporting one or more UEs.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Fifth Generation QoS Identifiers ("5QI"), Authentication, Authorization and Accounting ("AAA"), Access and Mobility Management Function ("AMF"), Positive-Acknowledgment ("ACK"), Application Programming Interface ("API"), Access Stratum ("AS"), Base Station ("BS"), Core Network ("CN"), Controller-to-Controller ("C2C"), Control Plane ("CP"), Data Network ("DN"), DN Assistance Information ("DNAI"), DN Name ("DNN"), Downlink ("DL"), Discontinuous Transmission ("DTX"), Edge Application Server ("EAS"), Edge Enabler Client ("EEC"), Edge Enabler Server ("EES"), Edge Data Network ("EDN"), Enhanced Mobile Broadband ("eMBB"), Evolved Node-B ("eNB"), Evolved Packet Core ("EPC"), Evolved Packet System ("EPS"), European Telecommunications Standards Institute ("ETSI"), Factory of the Future ("FF"), FF Application Enabler ("FFAE"), FFAE Client ("FFAE-C"), FFAE Server ("FFAE-S"), Fully Qualified Domain Name ("FQDN", also referred to as an "absolute domain name"), General Packet Radio Service ("GPRS"), Generic Public Service Identifier ("GPSI"), Generic Slice Template ("GST"), Global System for Mobile Communications ("GSM"), Home Subscriber Server ("HSS"), Internet-of-Things ("IoT"), Key Performance Indicator ("KPI"), Level of Automation ("LoA"), Local Area Data Network ("LADN"), Location Management ("LM"), Long Term Evolution ("LTE"), Massive IoT ("mIoT"), Mean Opinion Score ("MOS"), Mobility Management ("MM"), Mobility Management Entity ("MME"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Non-Public Network ("NPN"), Network Slice Instance ("NSI"), Network Slice Subnet Instance ("NSSI"), Network Slice Selection Policy ("NSSP"), Network Slice Selection Assistance Information ("NSSAI"), Original Equipment Manufacturer ("OEM"), Over-The-Top provider ("OTT"), Packet Data Unit ("PDU", used in connection with 'PDU Session'), Partially Qualified Domain Name ("PQDN", also referred to as a "relative domain name"), PC5 5QI ("PQI"), Policy Control Function ("PCF"), Public Land Mobile Network ("PLMN"), Quality of Experience ("QoE"), Quality of Service ("QoS"), Radio Access Network ("RAN"), Receive ("RX"), Session Management ("SM"), Session Management Function ("SMF"), Service Provider ("SP"), Single Network Slice Selection Assistance Information ("S-NSSAI"), Tracking Area ("TA", a grouping of cells similar to Location Area and Routing area in UMTS), TA Update ("TAU"), Time Sensitive Networking ("TSN"), Transmit ("TX"), Vehicle-to-Everything ("V2X"), Vehicle-to-Infrastructure ("V2I"), Vehicle-to-Vehicle ("V2V"), V2X Application Enabler ("VAE"), VAE Client ("VAE-C"), VAE Server ("VAE-S"), Unified Data Management ("UDM"), User Data Repository ("UDR"), User Entity/Equipment (Mobile Terminal) ("UE"), UE Route Selection Policy ("URSP"), Ultra High Reliability and Low Latency Communications ("URLLC"), Uplink ("UL"), User Plane ("UP"), Universal Mobile Telecommunications System ("UMTS"), User Service Description ("USD"), and Worldwide Interoperability for Microwave Access ("WiMAX").

In certain wireless communication systems, network slicing is one key 5G feature, which introduces logical end-to-end sub-networks corresponding to different verticals. In FF use cases, one or more network slices may be deployed to support different use cases. In V2X use cases, a service provider may use one or more network slices to support V2X services. V2X communication encompasses both V2V and V2I technology.

BRIEF SUMMARY

Disclosed are procedures for network profile re-mapping for an application supporting one or more UEs. One method of an application enabler server (e.g., V2X application enabler server, FF application enabler server and/or edge enabler server), includes configuring a first mapping of a first application to a first network profile, based on at least one application requirement, and receiving a trigger event report from the first application for adapting the at least one application requirement for at least one UE of the first application. The method includes determining, based on the trigger event report, a second mapping of the first application to a second network profile and transmitting the second mapping of the first application to the at least one UE of the first application.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
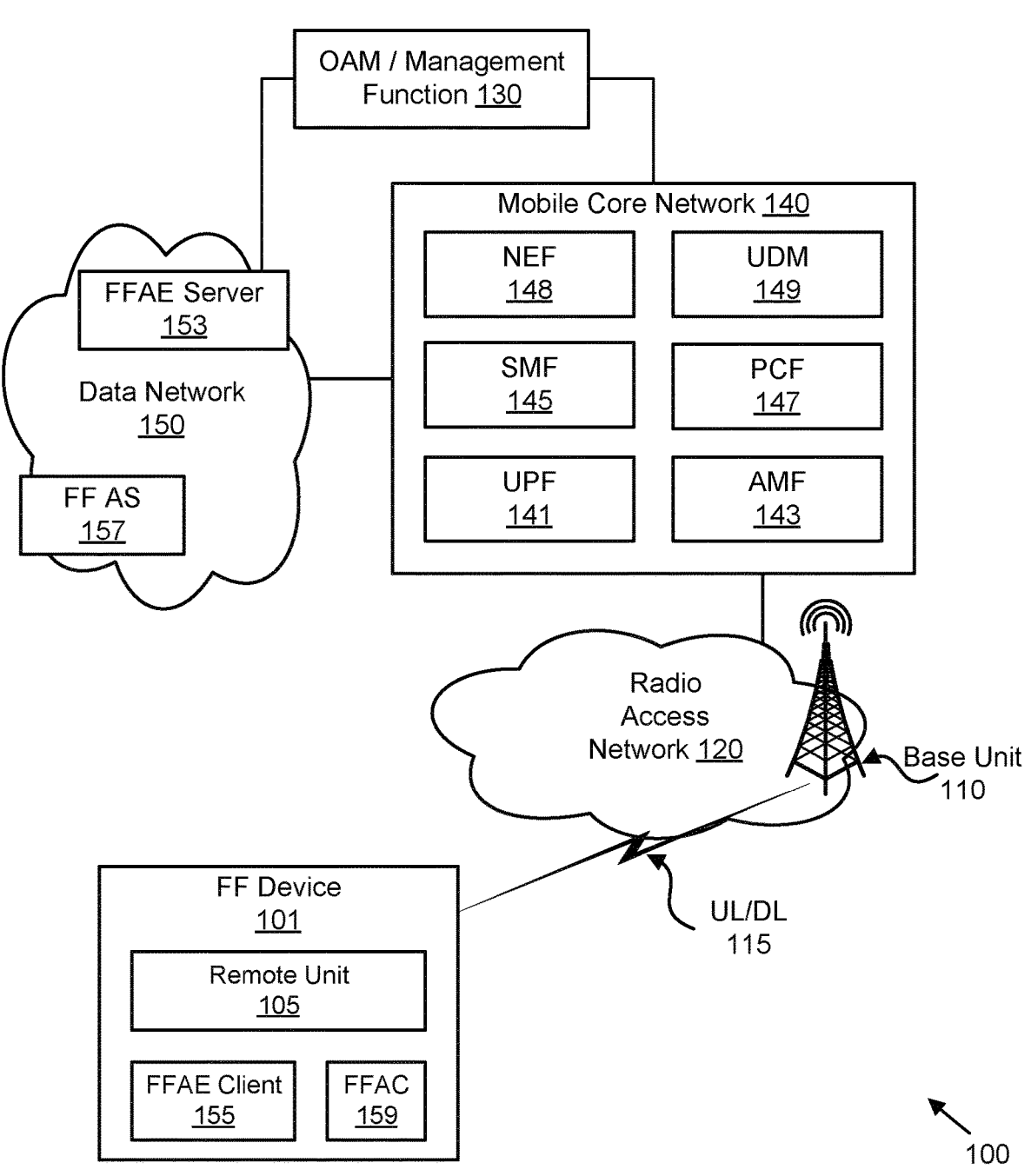
FIG. 1A is a schematic block diagram illustrating one embodiment of a wireless communication system supporting a FF vertical.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for network profile re-mapping for an application supporting one or more UEs. Disclosed herein are mechanisms/techniques for middleware-assisted slice and/or DNN re-mapping for one or more applications, based on the dynamic adaptation of the application requirements (e.g., service profile, QoE, mobility, communication model, etc.) to ensure meeting the application session requirements. These mechanisms/techniques are applicable to vertical industry use cases (including Factories of the Future ("FF") and Automotive/Vehicle-to-Everything ("V2X") vertical industries discussed below), as well as edge computing service use cases.

Network slicing is one key 5G feature, which introduces logical end-to-end sub-networks corresponding to different verticals. Network slicing allows the deployment of multiple logical, self-contained networks, offering third parties and verticals customized services on the top of a shared infrastructure. Based on a physical network that might be operated by a public operator or an enterprise, 5G provides the means to run multiple slices for different communication purposes. 5G allows to run those slices independently and if desired, isolated from each other.

A network slice (can be defined as private or public slice based on the scenario) always consists of a RAN part and a CN part. The support of network slicing relies on the principle that traffic for different slices is handled by different PDU sessions. Network can realize the different network slices by scheduling and also by providing different L1/L2 configurations. Each network slice is uniquely identified by a S-NSSAI, as defined in 3GPP TS 23.501.

Here, the NSSAI (Network Slice Selection Assistance Information) includes one or a list of S-NSSAIs (Single NSSAI) where a S-NSSAI contains a mandatory SST (Slice/ Service Type) field, which identifies the slice type and consists of 8 bits (with range is 0-255). A S-NSSAI may optionally contain a SD (Slice Differentiator) field, which differentiates among Slices with same SST field and consist of 24 bits.

The association of UEs to slices is a Core Network feature, and currently transparent to the application side; whereas, the application support for slices mainly involves the interaction between the 5GS (e.g., slice management system) and the 3rd party (tenants) via management exposure, for the pre-commissioning, operation and management of the slice end-to-end as specified.

The problem of application-to-slice mapping is not part of state of the art, because the application in current state is not slice-aware; however, application awareness and control of slicing will allow for tighter network control of verticals. Because application-to-slice mapping is not addressed by conventional system, conventional solutions for slice re-mapping are inadequate. In some systems, the UE may receive URSP rules from PCF and has the list of allowable slices to connect. When, the device identifies that it needs to change slice (from a set of subscribed slices), it may request a new slice via new PDU session establishment request (note that service continuity is not maintained).

In a RAN-based solution, if a UE moves to a target cell, slice-aware handover is supported in 3GPP. If the slice is not available, the PDU session is terminated. As an alternative, temporary slice support may be provided between source and target gNB. However, the RAN-based solution fails to inform the CN and does not support application-triggered adaptation.

In an OAM-based solution, the OAM plane configures the slice coverage (i.e., which cell/TA area support which slices). This slice coverage may change on demand (e.g., via NSI/NSSI modification). However, the OAM-based solution will affect also other users within this slice and users of other slices (i.e., it may provide interference to users of other slices in neighboring cells).

In a V2X solution, the V2X application is made aware of the slicing and based on a change of level of automation ("LoA") for a session, the V2X application interacts with the network to adapt service parameters which change the resource of the slice for the PDU session. However, this service parameter modification is not an application-to-slice remapping and does not support the dynamic adaptation of the application requirements.

As mentioned above, the solutions described herein are applicable to FF vertical industries and V2X vertical industries. The solutions are also applicable to edge computing services, where the PLMN provides connection to one or more edge-dedicated data networks.

In FF use cases (as specified in TS 22.104, TR 23.745), different deployment model may be considered. In a self-managed or outsourced private network deployment, aka Non-Public Network ("NPN"), the manufacturer or the service provider keeps control of the network build and digital capabilities. In a semi-private network via network slicing deployment, a mobile network operator uses network slicing to create a semi-private 5G network for the manufacturer. There is flexibility in tuning the technical capabilities of the product to meet connectivity needs.

In a smart factory, multiple slices may be deployed to support different use cases. For different areas inside a factory (e.g., control room, factory floor, outdoors, etc.) there are different communication/service requirements, which may be accommodated by different slices. For example, for the factory floor, there are scenarios where safety and reliability are very important (e.g., safety light curtain, machine layout planning), especially when 5G is used for the communication; hence, the use of different slice for the factory floor operations may be recommended.

For different stakeholders involved (OEMs, Factory owner, IoT provider, smart logistics company, OTT content provider, edge cloud provider) there might be different application requirements which result to different communication requirements, including performance metrics and isolation requirements.

For different traffic types, where isolation is important due to deterministic traffic requirements (e.g., TSN vs non-TSN traffic may require differentiated handling, which includes different traffic routing policies and application to DN association). In particular, TSN is a use case with deterministic KPIs (where the 5GS is seen as a L2 bridge), whereas the non-TSN traffic can be e.g., URLLC, eMBB, mIOT traffic. For such scenarios, TSN traffic can be accommodated by a different slice due to the deterministic requirements and different user-plane/control-plane handling.

For different interactions with the PLMN for the control plane, e.g., Autonomous C2C vs Remote C2C. Control-to-control (C2C) communication is needed when devices with separate controllers interact to perform a shared task. This can be Local/Autonomous when the controllers are in vicinity; or Remote in cases when servicing/maintenance is needed. For this scenario, the remote C2C communication may be deployed as new slice (since the UP and CP will differ end-to-end).

For different communication models, different slices may be pre-customized and deployed on demand, so as to allow the fast change from one communication model to another for the same application: but with different service profile. These communication models can be the following: Line-to-Controller, Controller-to-Controller, Controller-to-Device, Device-to-Compute.

In V2X use cases as defined in 3GPP TS 22.186, both safety and non-safety communications need to be supported with diverse and conflicting KPIs (latency, reliability, throughput). A V2X service provider may use one or more network slices for V2X to bundle one or more V2X services to support multiple KPI and QoS requirements. To this end, in TS 23.501, one standardized slice type (SST) has been defined to allow for Slice suitable for the handling of V2X services.

V2X scenarios may require different end-to-end configurations which may necessitate the use of different slices. One example is the different level of automation of the car. In TS 22.186, the following LoAs are defined which may apply for different use case: No Automation (0); Driver Assistance (1); Partial Automation (2); Conditional Automation (3); High Automation (4); and Full Automation (5). For the combination of each scenario and each degree of LoA, requirements are specified in terms of Payload (Bytes), Transmission rate (Message/Sec), Maximum end-to-end latency (ms), Reliability (%), Data rate (Mbps), Minimum required communication range (meters). V2X scenarios are delay and reliability critical while the rate (and thus the resource) requirement may vary, since they may support different payloads (from 300 B to 12000 B) under the strict delay requirement. In such example, the use of different slice mapping for the application may be necessary to adapt to the application QoS requirements, e.g., as captured by the LoA change.

Another example is that an application may provide multiple services, e.g., Advanced Driving application may include: Cooperative collision avoidance between UEs supporting V2X applications, Emergency trajectory alignment between UEs supporting V2X application, Cooperative lane change between UEs supporting V2X applications. These services may have different network requirements; and the use of slicing may make the required adaptations of one end-to-end configuration to another more efficient and flexible.

Certain architecture deployments use Edge-dedicated DNs for support of edge computing service (use of dedicated EDNs, use of LADN). In certain embodiments, the PLMN supporting edge computing services provides connection to several EDNs that correspond to one or more DNAI(s), and each EDN is identified by DNN of the Edge-dedicated DN and one or more DNAI.

In other embodiments, one the edge computing services can be provided via Edge-dedicated Data Networks deployed as LADNs. The PLMN supports edge computing services in the EDN service areas which can be identified by the service area corresponding to the respective LADN DNNs or LADN DNN and subset of Tracking Areas corresponding to the LADN service area. The LADN service area is the service area that the Edge Computing is supported. Each individual EAS in the LADN may support the same or smaller service area than the LADN.

A vertical application may be instantiated at a DN or one or more edge-dedicated EDNs/LADNs or in both DN and one or more EDNs/LADNs. In the areas covered by the EDN, some slices may not be supported at the network side (since a slice may be deployed in parts of PLMN/NPN due to network capabilities). Or due to change of application requirements when moving to a target EDN, a change of the slice at the target area may be needed. One example of such change is the AGV use case, for cooperative carrying on work items/pallets. Mobile Robots/AGVs move together to an area to carry a pallet/work piece. When moving towards this area, the navigation of the AGVs is performed by the source EDN using Slice #1, and when they reach the area to perform the carrying of the pallet e.g., at the are covered by the target EDN, the mapping of the application-to-service profile needs to change; hence the applications of the AGVs can be re-mapped to slice #2 to allow for different UP/CP configuration end-to-end.

In another given example, where a UE (who is subscribed to slices #1, #2) and is mapped to slice #1, moves from an area covered DNN-A1 (which covers a service area including slices #1, #3, #5) to an area covered by DNN-A2 (which covers a service area including slice #2, #4, #6). The EAS request for application relocation (to different EAS, and optionally to different EES) may be translated to a slice re-mapping request. It is assumed that EAS is not aware of slices; however, the EES could provide such translation.

For the above vertical use cases, a device/UE may need to dynamically change network slice due to application adaptation. In certain embodiments, this may be due to an application client requirement. In particular, the application of the UE captures that the UE moves to an area where the slice is not supported (or is not the preferable) and requests the application-to-slice re-mapping.

In certain embodiments, this may be due to application server requirement as exemplified above (e.g., request of adaption of the automation level, communication model, change of service profile/requirements), In certain embodiments, this may be for QoE optimization purposes at the application side (client/server). QoE is monitored by the application side, and factors like MOS/QoE scores may necessitate the change of a slice to improve the experience. This can be captured by the application client at the UE side or at the application server.

For such cases, the solutions disclosed herein describe how to perform a dynamic application-to-slice/DNN re-mapping for the UEs of an application running one or more services, e.g., re-selecting from slice #1 to slice #2.

A method is proposed at an application enabler (middleware) layer for enabling fast application to slice re-mapping, to deal with the dynamic adaptation of the application requirements in FF/V2X/EDGEAPP scenarios, where a plurality of slices is available within the same or different parts of the area coverage of the application (e.g., factory area)

The VAE-S/FFAE-S/EES receives a request from an application server to manage a set of application to service profile mapping for the devices which are running the FF application in a specific area.

The VAE-S/FFAE-S/EES, in response of receiving the request, determines an initial application to slice mapping (App #A to Slice #1), based on the service profile, the slice capabilities, the UE subscriptions (which are running this application) and the GST parameters (these are assumed to be available at the FFAE-S by OAM). Then, it establishes a session with VAE-C/FFAE-C/EEC to provide the application to slice mapping and the related configuration parameters (service profile, GST parameters, slice capabilities e.g., RAT/frequency per slice). Upon receiving the application to slice mapping, the UE registers with the network and URSP rules are configured to the UE by the PCF One trigger event is the vertical application specific server or client requesting VAE-S/FFAE-S/EES for a new service profile for the application. This may be due to UE mobility change, QoE improvement, or any other application requirement which may affect the application-to-slice mapping. Other trigger events are described below with reference to FIGS. 2-5.

Upon receiving the trigger event report, the VAE-S/FFAE-S/EES determines the remapping of App #A to Slice #2, based on the new service profile, the new application QoE/QoS requirements, the UEs subscriptions (which are running this application), the slice availability/capabilities and monitored slice conditions (this is currently supported by the network/NWDAF based on subscription).

The VAE-S/FFAE-S/EES sends to all the vertical application enabler clients corresponding to all UEs running the application, about the re-mapping required to Slice #2. Based on this request, a new PDU session is triggered for slice #2 and the current PDU Session for slice #1 gets terminated. The description of the solution and the embodiments are provided for application-to-slice mapping, but this is not limited to slicing but to application-to-DNN mapping too.

Figure 1B:
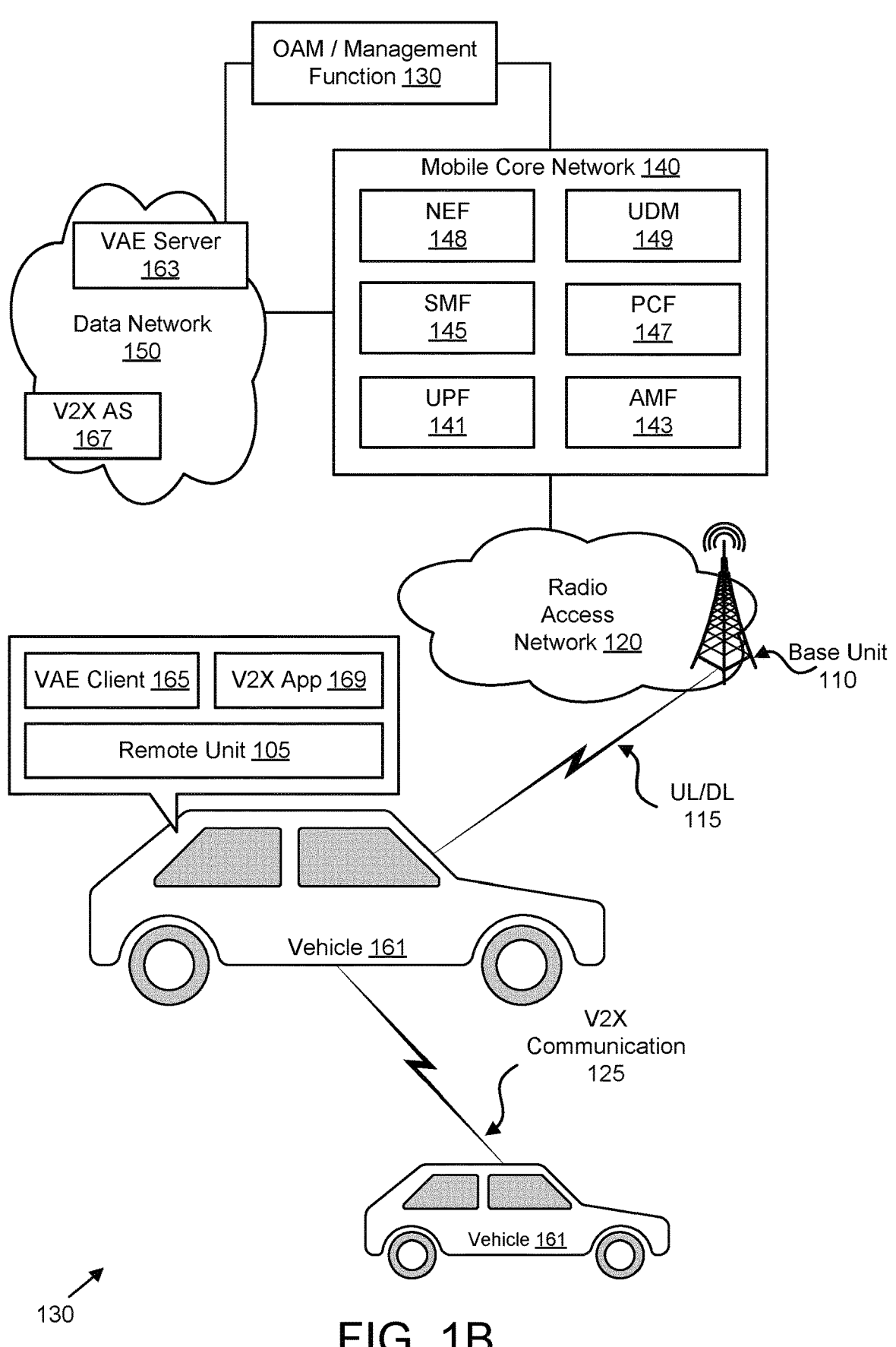
FIG. 1B is a schematic block diagram illustrating one embodiment of a wireless communication system supporting a V2X vertical.
Figure 1C:
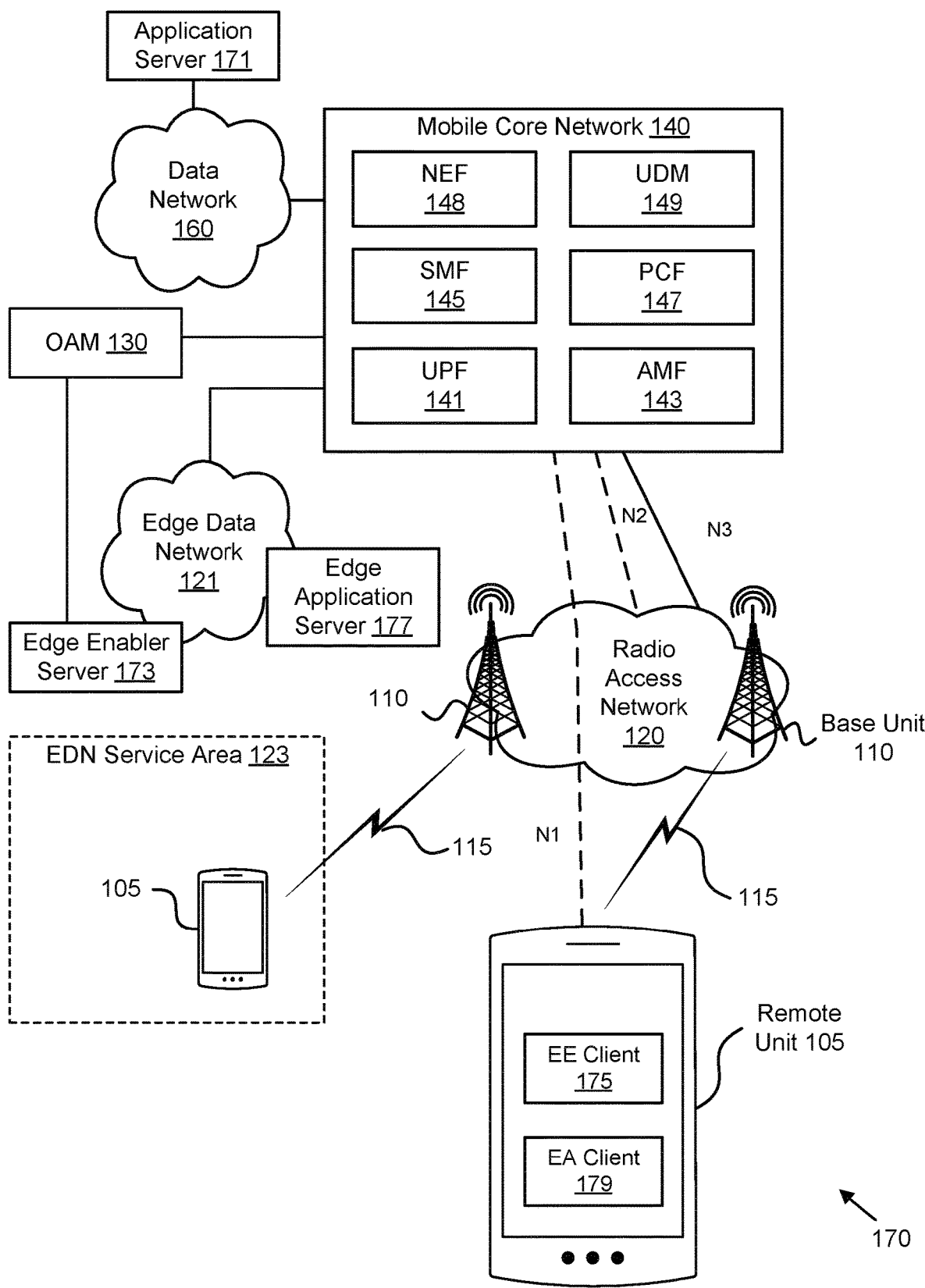
FIG. 1C is a schematic block diagram illustrating one embodiment of a wireless communication system supporting edge computing service.

FIGS. 1A-1C depict a wireless communication system 100 for conveying unicast sessions over a direct communication link via V2X communication signals 125, according to embodiments of the disclosure. In various embodiments, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIGS. 1A-1C, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In FIG. 1A, the wireless communication system 100 supports a FF vertical, including a FF Device 101, a FF Application Enabler ("FFAE") Server 153 and FFAE Client 155, at least one FF Application-Specific Server ("FF AS") 157 and FF Application Client ("FFAC") 159. In some embodiments, the wireless communication system may include a TSN system and/or a non-TSN system (not depicted).

In FIG. 1B, the wireless communication system 130 supports a V2X vertical, including vehicles 161, a V2X Application Enabler ("VAE") Server 163 and VAE client 165, and at least one V2X Application-specific Server ("V2X AS") 167 and V2X application client 169. As depicted, the vehicles 161 include a remote unit 105 and may communicate directly with each other (e.g., device-to-device communication) using V2X communication signals 125. Here, V2X transmissions may occur on V2X resources. A remote unit 105 may be provided with different V2X communication resources for different V2X modes. Mode-1 corresponds to a NR network-scheduled V2X communication mode. Mode-2 corresponds to a NR UE-scheduled V2X communication mode. Mode-3 corresponds to an LTE network-scheduled V2X communication mode. Mode-4 corresponds to an LTE UE-scheduled V2X communication mode.

The remote unit 105 includes a VAE client 165 at a V2X middleware layer (i.e., an application-enabling function), which is configured to report to the VAE server 163 whenever a certain condition occurs indicating a need to adapt a network profile mapping.

The VAE layer, by providing some initial support functionalities for V2X use cases, is a V2X application enabler layer for efficient use and deployment of V2X services over 3GPP systems. This V2X application enabler (VAE) layer comprises a VAE server 163 which may be either a PLMN-owned or a 3rd party/vertical server, and one or more VAE clients 165 at the vehicle side. The VAE server 163 is a middleware platform that provides support functionalities to the enabler clients; and interacts with the application specific servers (e.g., platooning server) as well as with the involved PLMNs, to ensure meeting the per vertical requirements.

There, the server- and client-side V2X application layer support functions are defined:

The VAE server 163 provides the server-side V2X application layer support functions, including communicating with the underlying 3GPP network system for unicast and multicast network resource management, receiving monitoring reports/events from the underlying 3GPP network system (5GS and/or EPS) regarding network situation corresponding to RAN and core network, supporting registration of V2X UEs, tracking the application level geographic location of the V2X UEs, supporting V2X message distribution for the V2X applications, supporting provisioning of 3GPP system configuration information (e.g., V2X USD, PC5 parameters), perform the role of content provider for multicast file transfer using xMB APIs, providing network monitoring reports to the V2X UEs, communicating V2X service requirements to the underlying 3GPP network system (5GS and/or EPS), maintaining the mapping between the V2X user ID and the V2X UE ID, providing V2X service discovery, supporting V2X service continuity, and supporting V2X application resource adaptation.

The VAE client 165 provides the client-side V2X application layer support functions, including registration of VAE clients 165 for receiving V2X messages, receiving V2X messages from the VAE server 163 and the delivery to V2X application specific client(s) according to the V2X service ID, perform the role of the MBMS client for multicast file transfer using xMB APIs, receiving network monitoring reports from the VAE server, supports switching the modes of operations for V2V communications (e.g., between direct and indirect V2V communications), providing application-level locations to the VAE server 163 (e.g., tile, geo-fence), receiving 3GPP system configuration information (e.g., V2X USD, PC5 parameters) from the VAE server 163, supporting dynamic group management, and supporting interactions with the V2X application specific client(s) 169.

In FIG. 1C, the wireless communication system 170 supports an edge computing service deployment including at least one edge data network ("EDN") 121 supporting an EDN service area 123. The EDN 121 includes at least one Edge Application Server ("EAS") 177 supporting an instance of an application. When a remote unit 105 is located in the EDN service area 123, Edge Application client 179 is able to access the EAS 177. However, when the remote unit 105 is outside any EDN service area, the EA client 179 is able to access an instance of the application using the Application server 171 located in the data network 150 (i.e., a regional data network). The EDN 121 also includes an edge enabler server ("EES") 173, a middleware application enabler server, while the remote unit 105 includes an edge enabler client ("EEC") 175.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with a communication host (e.g., edge application server 173 and/or application server 171) via a network connection with the mobile core network 140. For example, an application client (e.g., web browser, media client, telephone/VoIP application, FF application client 107, V2X application client 169, edge application client 179) in a remote unit 105 may trigger the remote unit 105 to establish a PDU session (or other data connection) with the mobile core network 140 via the RAN 120. The mobile core network 140 then relays traffic between the remote unit 105 and the communication host (i.e., application server) using the PDU session. Note that the remote unit 105 may establish one or more PDU sessions (or other data connections) with the mobile core network 140. As such, the remote unit 105 may concurrently have at least one PDU session for communicating with one application server and at least one additional PDU session for communicating with another application server (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, a Network Exposure Function ("NEF") 148, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC. In some embodiments, the UDM 149 is co-located with a User Data Repository ("UDR").

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network slice instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

The wireless communication system 100 includes an OAM/Management function 130. The OAM/Management function 130 may provide slice parameters (e.g., GSTs) to the enabler servers (e.g., FFAE-S 153, VAE-S 163, and/or EES 173). In various embodiments, the OAM/Management function 130 performs slice instantiation, e.g., in response to a request from a service provider.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described solutions apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term eNB/gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting middleware-assisted slice and/or DNN re-mapping for vertical applications and/or edge network deployments.

Figure 2:
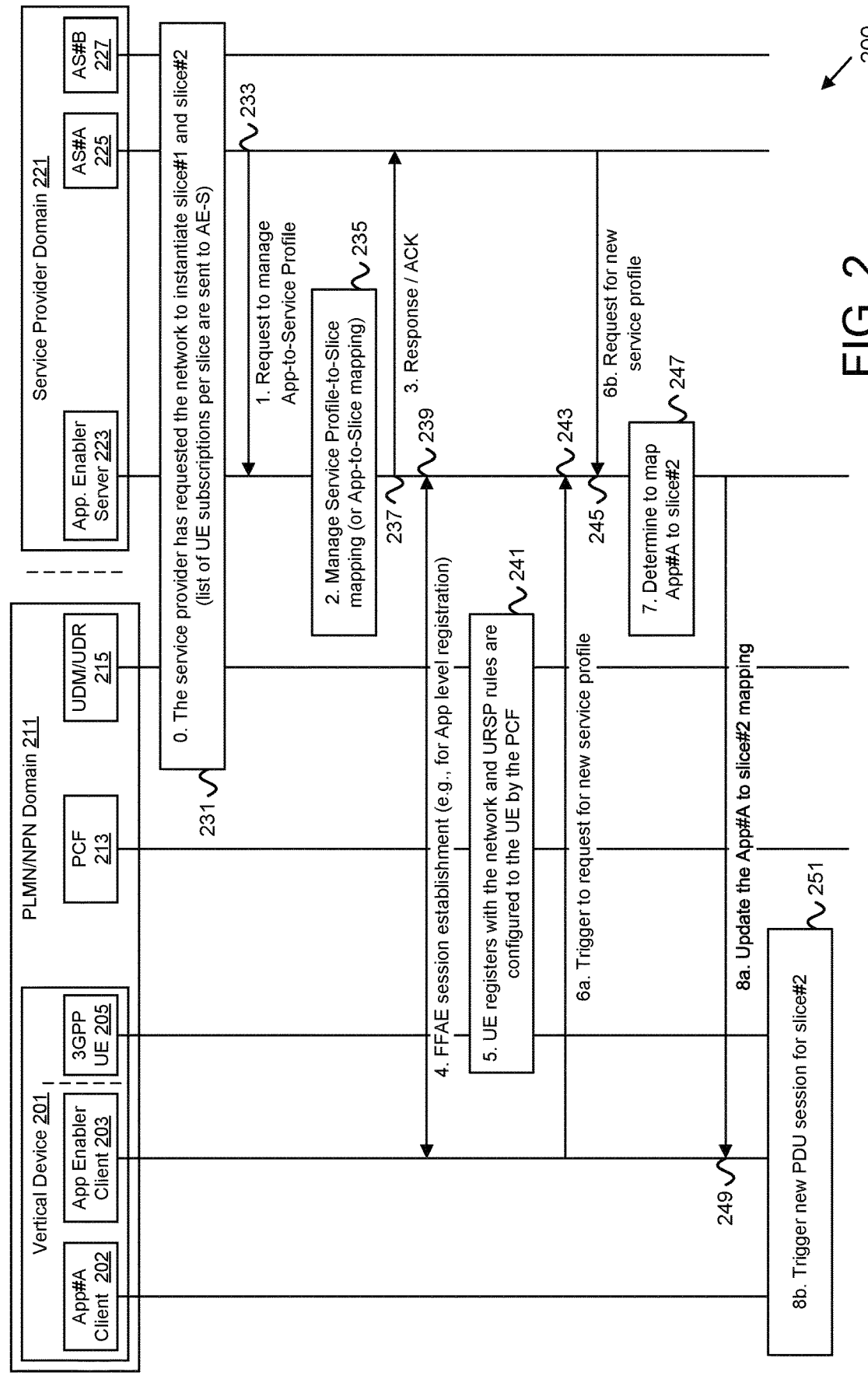
FIG. 2 is a diagram illustrating signaling flow for one embodiment of a procedure for application-triggered and enabled slice and/or DNN re-mapping for vertical application deployment.

FIG. 2 depicts a procedure 200 for application-triggered and enabled slice and/or DNN re-mapping for vertical application deployment, according to embodiments of the disclosure. The procedure 200 involves a vertical device 201 (e.g., a FF device 101 or vehicle 161) comprising an application client 202 for a first application (referred to as "App #A"), an Application Enabler client 203, and a UE 205. The application client 202 may be one embodiment of the FFAC 159 and/or V2X App 169, as is at an application layer of the vertical device. The Application Enabler client 203 may be an embodiment of the FFAE-C 155 and/or VAE-C 165, and is at a middleware layer of the vertical device. The UE 205 may be one embodiment of the remote unit 105, and represents the NAS/AS layers of the vertical device. The procedure 200 also involves a PCF 213 and UDM/UDR 215 in the PLMN (or NPN) domain 211, as well as an Application Enabler server 223, an application server 225 for App #A (referred to as "App Server #A" 225) and an application server 227 for a second application (shown as "AS #B" 227). The Application Enabler server 223 may be one embodiment of the FFAE-S 153 and/or the VAE-S 163, while the application server 225 and application server 227 may be embodiments of the FF AS 157 and/or V2X AS 167.

The embodiment of FIG. 2 provides a solution for the configuration of the initial application-to-slice mapping, as well as the adaptation of the mapping when a trigger event is sent by the application layer. This embodiment handles the slice re-mapping in application layer signaling (with minimum impact at 5GS). It is assumed that the UE subscriptions are available at step 0, and the VAE-C/FFAE-C triggers the slice re-selection towards the network (using new PDU session establishment request). In the depicted embodiment, the middleware is distributed among a server and a client (aka Application Enabler server 223 and Application Enabler client 203, respectively). The functionality resides at the Application Enabler client 203 but will be configured by the Application Enabler server 223 or an application-specific server.

At Step 0, as a first precondition, the service provider has requested the network (e.g., PLMN or NPN) to instantiate a first network slice (i.e., "slice #1") and a second network slice (i.e., slice #2) (see block 231). Here, the slice instantiation is performed at the Management domain (i.e., by the OAM 130). In Step 0, it is assumed that the list of UE subscriptions per slice are sent to the Application Enabler server 223 (e.g., VAE-S/FFAE-S) at this point. Slice information, such as Generic Slice Template ("GST") parameters are also sent to the Application Enabler layer (e.g., FFAE/VAE layer) by the Management domain at this point. Note that the UE subscriptions data which are required by the enabler server are the per-UE subscribed S-NSSAIs. These data are collected for all the UEs running the list of applications which are onboarded to the Application Enabler server 223.

At Step 1, the App Server #A 225 sends to the Application Enabler server 223 a request for managing the application to slice mapping (see messaging 233). This request includes one or more of the following parameters:

Application ID
Transaction ID
Service profile(s) and ID(s)
Service requirements
PLMN ID/NPN ID
App to DNN mapping
Application registration/context parameters
Enforcement flag (i.e., indicating whether the VAE-S/FFAE-S has the permission to enforce or just recommend a change)
UE IDs (GPSI, external ID, group ID) within the application
Area of validity (e.g., defined using cell IDs, TA ID) and time of validity At Step 2, the Application Enabler server 223 determines the mapping of App #A to slice #1 (see block 235). This mapping is based on the service profile/parameters, the per-UE slice subscriptions (for all UEs running App #A), slice capabilities and availability (based on network slice monitoring), the GST parameters from Step 0.

At Step 3, the Application Enabler server 223 provides a response/ACK to the App Server #A 225, as acknowledgement for undertaking the management of the Application-to-Slice mapping (see messaging 237).

At Step 4, the Application Enabler server 223 establishes an FFAE/VAE session (see messaging 239). In particular, the Application Enabler server 223 sends a session setup request message to one or more Application Enabler clients 203, which includes a request to Application Enabler client 203 to send a first report to enabler server when a first condition occurs like QoE degradation indication, UE mobility change (which is the criteria for triggering for application to service profile adaptation). The Application Enabler client 203 then may provide a session setup response/result message (ACK/NACK).

At Step 5, the UE 205 registers with the network and URSP rules are configured to the UE 205 by the PCF 213 (see block 241). In various embodiments, the registration and URSP rule configuration occurs as described in 3GPP TS 23.501 and TS 23.503. Note, however, that separate URSP rules would be needed for each subscribed S-NSSAI, where the Rule Precedence will define the URSP rule priorities (e.g. URSP Rule 1>URSP Rule 2) to help associating the application with the slice. For example, URSP Rule 1 for slice #1:
  Traffic Descriptor: Application ID or 5-tuple, S-NSSAI X (S-NSSAI within connection capabilities or a new field).
  Route Selection Descriptor: S-NSSAI X, DNN: Internet, SSC Mode 1.

16

URSP Rule 2 for slice #2:
  Traffic Descriptor: Application ID or 5-tuple, S-NSSAI Y (S-NSSAI within connection capabilities or a new field).
  Route Selection Descriptor: S-NSSAI Y, DNN: Internet, SSC Mode 1.

At Step 6, a trigger event is captured at the application layer. Two options are possible, shown in Step 6a and Step 6b.

For Step 6a, the Application Enabler client 203 identifies that the App #A client 202 needs to adapt the application-to-service-profile mapping (see messaging 243). For example, the Application Enabler client 203 may identify this need by monitoring the QoE measurements or by checking the location of the UE (from app client, or LM client). The Application Enabler client 203 sends a trigger event report (based on the configuration from the enabler server (e.g., QoE metric <X %) which provides information on one or more of the following:

UE IDs (GPSI, group ID)
Application ID
FFAE-S/VAE-S ID (i.e., identified by FQDN)
New service profile ID
New service requirements
QoE degradation notification
UE mobility change notification
Degradation of Application QoS attributes (reliability, latency, jitter, . . . )

For Step 6b, the Application Enabler server 223 receives from the App Server #A 225 a request to adapt the application requirements (see messaging 245). This request can comprise one or more of the following actions:

Change of the automation level of the application
Change of the communication model
Change of the service profile/requirements which are mapped to the application
Change of the service area coverage for the application
Change of QoE targets At Step 7, the Application Enabler server 223 determines the re-mapping of App #A to slice #2 (see block 247). This new mapping is based on the updated application requirements (as of step 6a/6b), the per-UE slice subscriptions (for all UEs running App #A), slice capabilities and availability (based on network slice monitoring), the GST parameters from Step 0.

At Step 8a, the Application Enabler server 223 sends the updated Application-to-Slice mapping to the Application Enabler client 203 of the UEs running the application App #A (see messaging 249). This message includes the App ID, old Slice ID, new Slice ID, slice access parameters, time and area of validity.

At Step 8b, based on the updated mapping, the UE 205 triggers a new PDU session establishment (and the termination of the current PDU session) to re-map to slice #2 (see block 251). In particular, based on the Application-to-Slice re-mapping, the application layer of the UE 205 sends an updated URSP rule precedence to the NAS layer of the UE 205 (i.e., URSP rule 2>URSP rule 1). This triggers the termination of the PDU session and the new PDU session establishment with the updated URSP policy (URSP rule 2), where Slice #2 is supported.

Note that while the above description of the solution and the embodiments are provided for application-to-slice mapping, but this is not limited to network slicing but also applies to Application-to-DNN mapping too. In such embodiments, the Application Enabler server 223 may remap App #A from a first DNN to a second DNN and send the updated mapping to the Application Enabler client 203.

Figure 3:
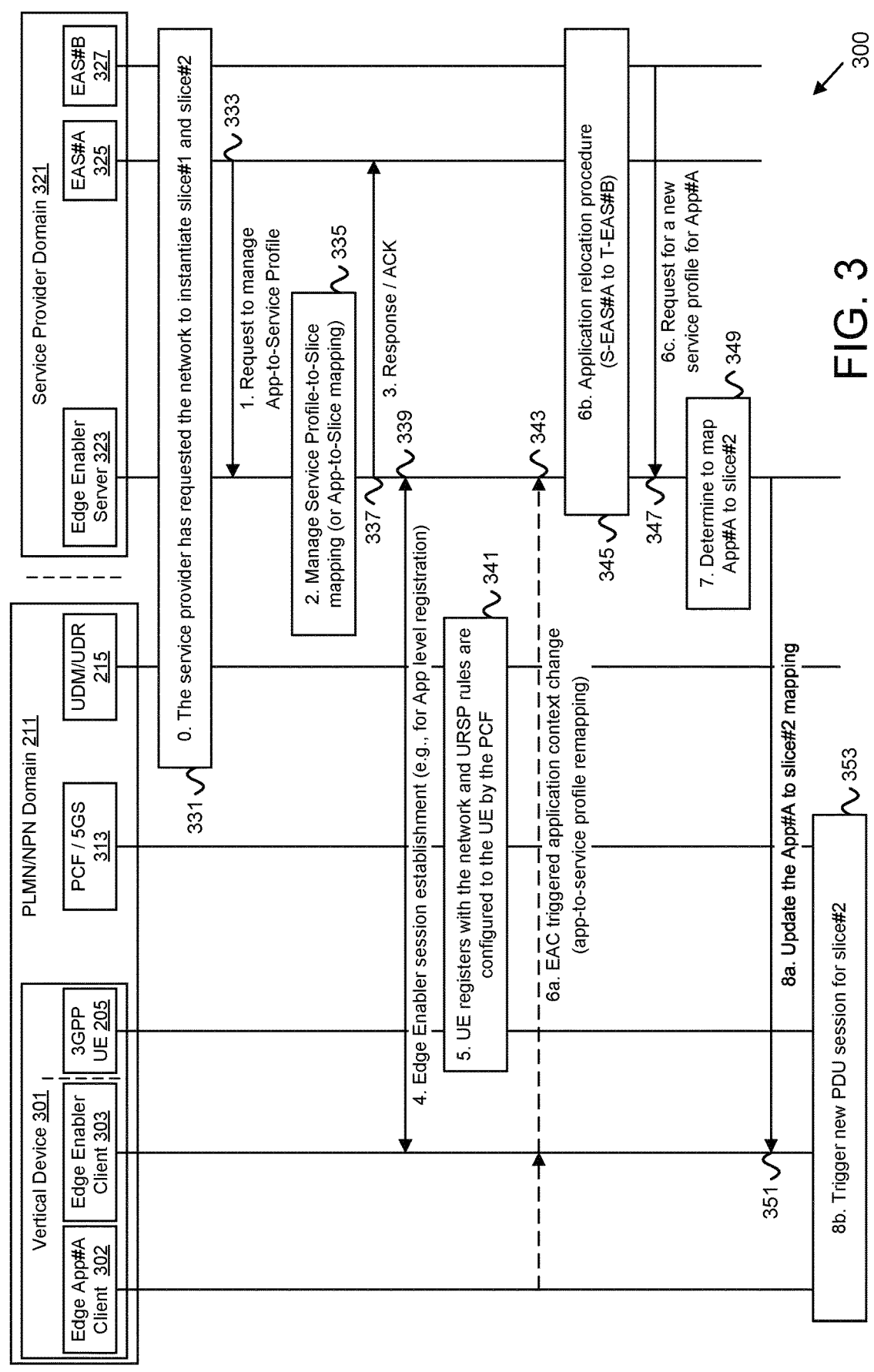
FIG. 3 is a diagram illustrating signaling flow for one embodiment of a procedure for application-triggered and enabled slice and/or DNN re-mapping for edge data network deployment.

FIG. 3 depicts a procedure 300 for application-triggered and enabled slice and/or DNN re-mapping for edge data network deployment, according to embodiments of the disclosure. The procedure 300 involves a vertical device 301 comprising an edge application client 302 for a first application (referred to as "App #A"), an Edge Enabler client 303 and the UE 205. The edge application client 302 may be one embodiment of the EAC 179, and is at an application layer of the vertical device. The Edge Enabler client 303 may be an embodiment of the EEC client 175, and is at a middleware layer of the vertical device. The procedure 300 also involves the PCF 213 and UDM/UDR 215 in the PLMN (or NPN) domain 211, as well as an Edge Enabler server 323, an edge application server 225 for App #A (shown as "EAS #A" 325, also referred to as "Edge App Server #A" 325) and an edge application server 227 for a second application (shown as "EAS #B" 327). The Edge Enabler server 323 may be one embodiment of the EES 173, while the edge application server 325 and edge application server 327 may be embodiments of the edge application server 177.

The embodiment of FIG. 3 provides a solution for the configuration of the initial application-to-slice mapping, as well as the adaptation of the mapping when a trigger event is sent by the application layer for the scenario of edge applications. This embodiment handles the slice re-mapping in application layer signaling (with minimum impact at 5GS). The scenario is that the vertical device 301 is moving to an area where application needs to be re-located to a different Edge Application Server area, where the service profiles may not be fulfilled. In this situation, the Edge Enabler server 323 needs to have the capability to update the application to slice mapping, in order to ensure that the application QoS requirements are met. In the depicted embodiment, the middleware is distributed among a server and a client (aka Edge Enabler server 323 and Edge Enabler client 303, respectively). The functionality resides at the Edge Enabler client 303 but will be configured by the Edge Enabler server 323 or an application-specific server.

At Step 0, as a first precondition, the service provider has requested the network to instantiate slice #1 and slice #2 (see block 331). The slice instantiation is performed at the Management domain. Slice information, such as GST parameters are also sent to the Application Enabler layer (i.e., Edge Enabler layer) by the Management domain at this point (e.g., sent from OAM 130).

At Step 1, the Edge App Server #A 325 sends to Edge Enabler server 323 a request for managing the application to slice mapping (see messaging 333). This request includes one or more of the following parameters:

Application ID
Transaction ID
Service profile(s) and ID(s)
Service requirements
PLMN ID, NPN ID
Application-to-EDN/LAND mapping
Application configuration and/or context parameters
Enforcement flag (i.e., indicating whether the Edge Enabler server 323 has the permission to enforce or just recommend a change)
UE IDs (GPSI, external ID, group ID) within the application
Area of validity (cell IDs, TA ID) and time of validity.

At Step 2, the Edge Enabler server 323 determines the mapping of App #A to slice #1 (see block 335). This mapping is based on the service profile/parameters, the per-UE slice subscriptions (for all UEs running App #A), slice capabilities and availability (based on network slice monitoring), the GST parameters from Step 0.

At Step 3, the Edge Enabler server 323 provides a response (i.e., ACK) to the Edge App Server #A 325, as acknowledgement for undertaking the management of the Application-to-Slice mapping (see messaging 337).

At Step 4, the Edge Enabler server 323 establishes an Edge Enabler ("EE") session (see messaging 339). In particular, the Edge Enabler server 323 sends a session setup request message to one or more Edge Enabler clients 303, which includes a request to Edge Enabler client 303 to send a first report to enabler server when a first condition occurs like QoE degradation indication, UE mobility change (which is the criteria for triggering for application to service profile adaptation). The Edge Enabler client 303 then may provide a session setup response/result message (ACK/NACK).

At Step 5, the UE 205 registers with the network and URSP rules are configured to the UE 205 by the PCF 213 (see block 341). Again, separate URSP rules may be needed for each subscribed S-NSSAI, where the Rule Precedence will define the URSP rule priorities (URSP Rule 1>URSP Rule 2) to help associating the application with the slice.

At Step 6a (optional), a trigger event is captured at the application layer. The Edge Enabler client 303 identifies that the application (i.e., App #A) needs to perform application relocation to a different EAS (e.g., from EAS #A 325 to EAS #B 327). For example, the Edge Enabler client 303 may identify this need by monitoring the QoE measurements or by checking the location of the vertical device 301 (from app client, or LM client). The Edge Enabler client 303 sends a trigger event (see messaging 343) which provides information on:

UE IDs (GPSI, group ID)
Application ID
EES ID (i.e., identified by FQDN)
New service profile ID
New service requirements
Trigger to change from EAS #A to EAS #B service area
Degradation of Application QoS attributes (reliability, latency, jitter, . . . )

At Step 6b, based on the trigger event from the Edge Enabler client 303 (or based on EAS-triggered application relocation trigger), the Edge Enabler server 323 determines that application re-location is needed from Edge App Server #A 325 to Edge App Server #B 327 (see block 345). One example of application re-location is provided at 3GPP TR 23.758 (Solutions #9, #16, #21) and 3GPP TS 23.558 clause 8.8.

At Step 6c, the target EAS (Edge App Server #B 327) sends a request to the Edge Enabler server 323 to adapt the application requirements (see messaging 347). This request can comprise one or more of the following actions:

Change of the automation level of the application
Change of the communication model
Change of the service profile/requirements which are mapped to the application
Change of QoE targets At Step 7, the Edge Enabler server 323 determines the re-mapping of App #A to slice #2 (see block 349). This new mapping is based on the updated application requirements (as of step 5a/5c), the per-UE slice subscriptions (for all UEs running App #A), slice capabilities and availability at the target EAS area, the GST parameters from Step 0.

At Step 8a, the Edge Enabler server 323 sends the updated Application-to-Slice mapping to the Edge Enabler client 303 of the UEs 205 running the application App #A (see messaging 351). This message includes the App ID, old Slice ID, new Slice ID, slice access parameters, time and area of validity.

At Step 8*b*, based on the updated mapping, the UE 205 triggers a new PDU session establishment (and the termination of the current PDU session) to re-map to slice #2 (see block 353). In particular, based on the Application-to-Slice re-mapping, the application layer of the vertical device 301 sends an updated URSP rule precedence to the UE 205 (i.e., URSP rule 2>URSP rule 1). This triggers the termination of the PDU session and the new PDU session establishment with the updated URSP policy (URSP rule 2), where Slice #2 is supported.

Note that while the above description of the solution and the embodiments are provided for application-to-slice mapping, but this is not limited to network slicing but also applies to Application-to-DNN mapping too. In such embodiments, the Edge Enabler server 323 may remap App #A from a first DNN to a second DNN and send the updated mapping to the Edge Enabler client 303.

Figure 4A:
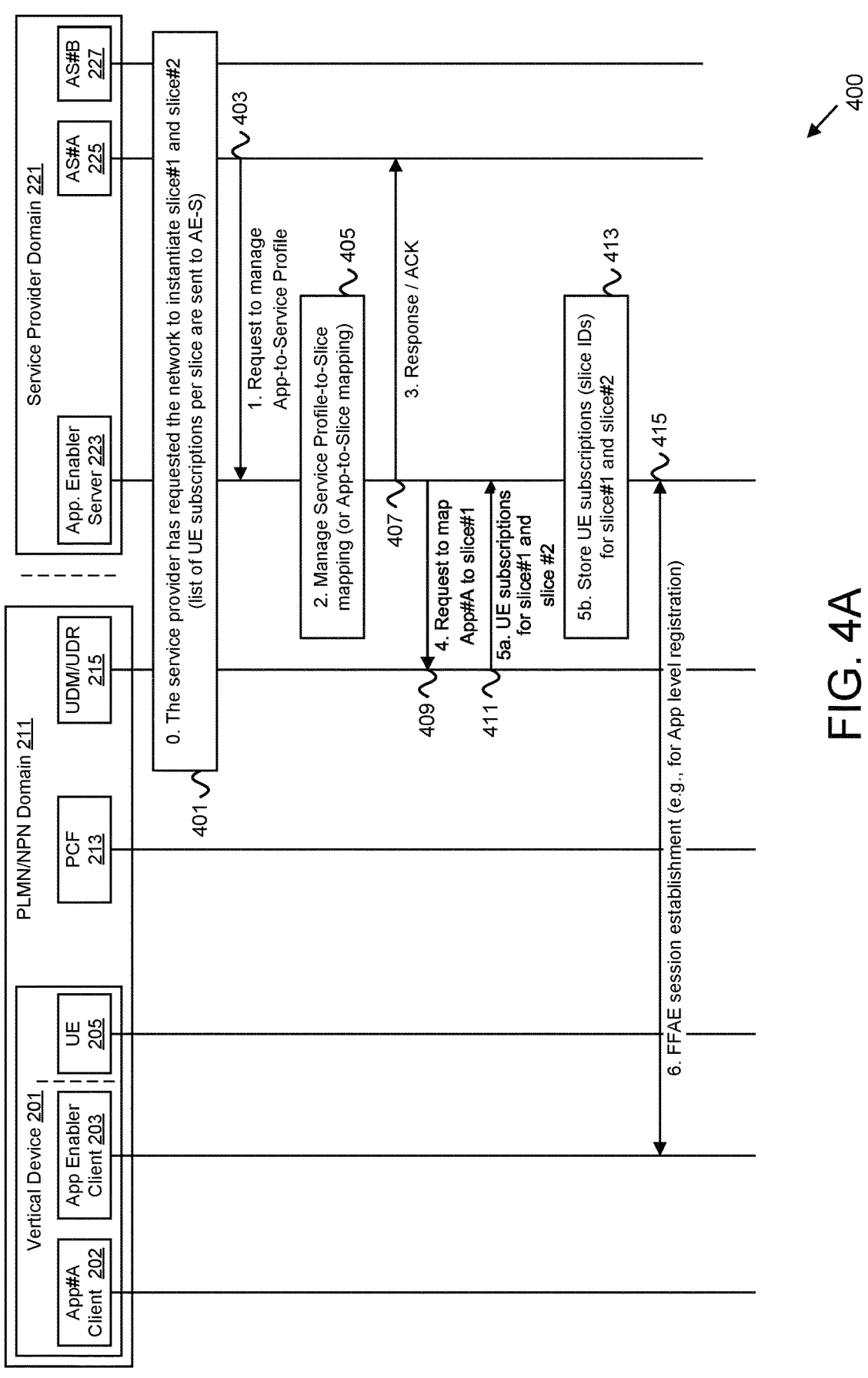
FIG. 4A is a diagram illustrating signaling flow for one embodiment of a procedure for application-triggered and network-enabled slice and/or DNN re-mapping for vertical application deployment.
Figure 4B:
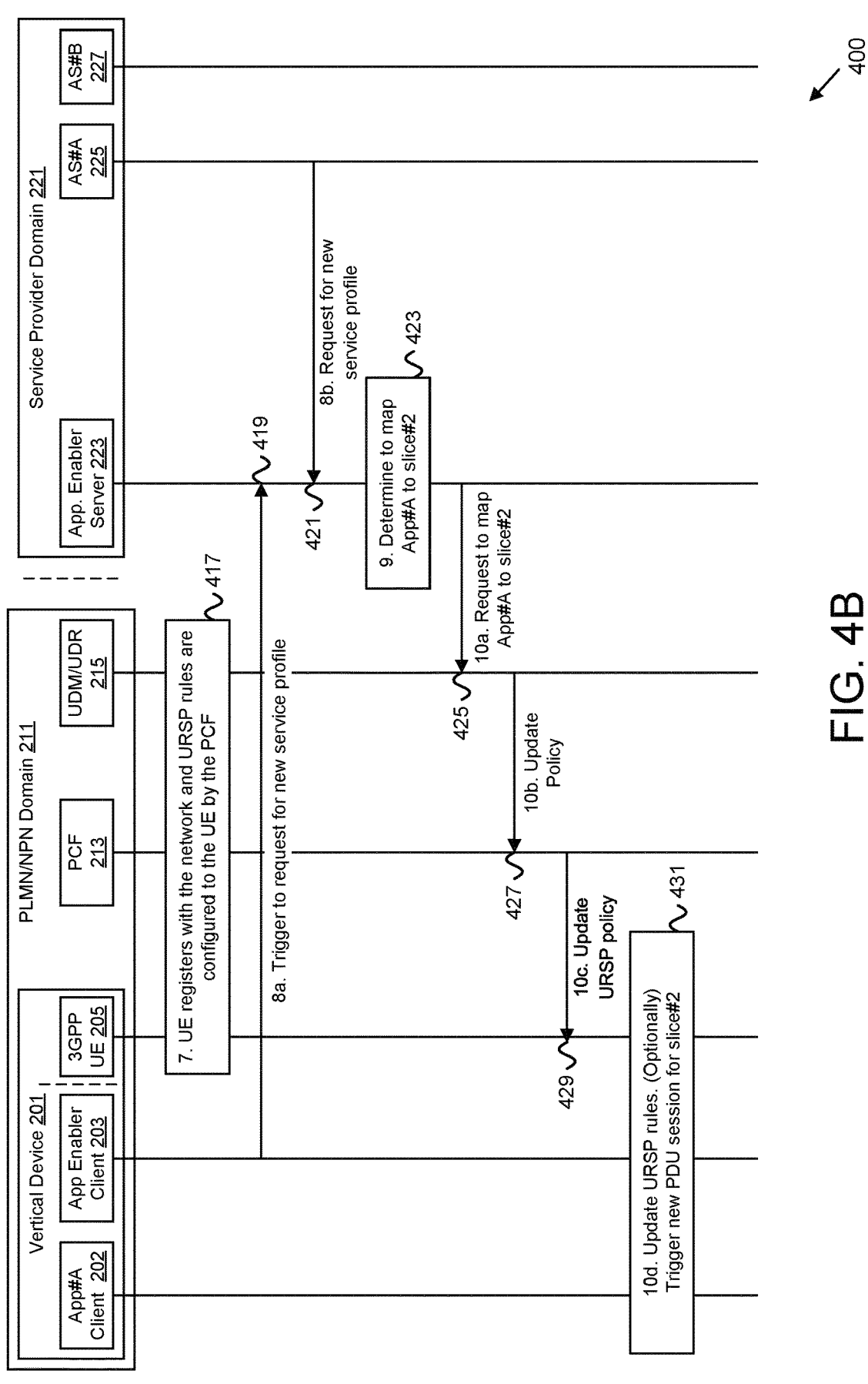
FIG. 4B is a continuation of the procedure in FIG. 4A.

FIGS. 4A-4B depict a procedure 400 for application-triggered and network-enabled slice and/or DNN re-mapping for vertical application deployment, according to embodiments of the disclosure. The procedure 400 involves the vertical device 201 comprising the application client 202 for the first application (referred to as "App #A"), the Application Enabler client 203, and the UE 205. The procedure 400 also involves the PCF 213 and UDM/UDR 215 in the PLMN (or NPN) domain 211, as well as the Application Enabler server 223, the application server 225 for App #A (shown as "AS #A" 225) and the application server 227 for a second application (shown as "AS #B" 227).

This embodiment provides a solution for the configuration of the initial application to slice mapping, as well as the adaptation of the mapping when a trigger event is sent by the application layer. This embodiment handles the slice re-mapping at the Application Enabler server 223 (VAE-S/FFAE-S) via interacting with the network to capture the re-mapping which is handled at the network side per each UE 205 by adapting the UE subscription/URSP rules. In particular, this is done via passing UE subscriptions per-application from UDM/UDR 215 to Application Enabler server 223, and request to change slice for application from Application Enabler server 223 to PCF 213 signaling, indirectly by updating URSP rules at UE 205 and triggering slice re-selection.

Turning to FIG. 4A, at Step 0, as a first precondition, the service provider has requested the network to instantiate slice #1 and slice #2 (see block 401). The slice instantiation is performed at the Management domain. Slice information, such as GST parameters, are also sent to the Application Enabler layer (FFAE/VAE layer) by the Management domain at this point.

At Step 1, the App Server #A 225 sends to the Application Enabler server 223 a request for managing the application to slice mapping (see messaging 403). This request includes one or more of the following parameters:

Application ID
Transaction ID
Service profile(s) and ID(s)
Service requirements
PLMN ID, NPN ID
Application-to-DNN mapping
Application configuration/context parameters Enforcement flag (indicating whether the VAE-S/FFAE-S has the permission to enforce or just recommend a change)
UE IDs (GPSI, external ID, group ID) within the application
Area of validity (e.g., identified by cell IDs, TA ID, etc.) and time of validity.

At Step 2, the Application Enabler server 223 determines the mapping of App #A to slice #1 (see block 405). This mapping is based on the service profile/parameters, the per-UE slice subscriptions (for all UEs running App #A), slice capabilities and availability (based on network slice monitoring), the GST parameters from Step 0.

At Step 3, the Application Enabler server 223 provides a response (i.e., ACK) to the App Server #A 225, as acknowledgement for undertaking the management of the Application-to-Slice mapping (see messaging 407).

At Step 4, the Application Enabler server 223 sends the App #A-to-slice #1 mapping to the UDM/UDR 215 and also requests the UE subscriptions related to App #A (e.g., to which slices they are allowed to connect, see messaging 409). The UDM 215 translates the per-application slice request, to the per-UE slice polices based on the stored subscriptions at the UDR (e.g., UEs #1, #2 of App #1, are mapped from Slice #1). This message includes the App ID, UE IDs, old Slice ID, new Slice ID, slice access parameters, and time and area of validity.

At Step 5*a*, the UDM 215 provides all the UE subscriptions for App #A to the Application Enabler server 223, in order to allow the enabler server to know which are the allowable mappings for the App #A (see messaging 411). At Step 5*b*, the Application Enabler server 223 stores UE subscriptions (slice IDs) for slice #1 and slice #2 (see block 413).

At Step 6, the Application Enabler server 223 establishes an FFAE/VAE session (see messaging 415). In particular, the Application Enabler server 223 sends to one or more clients, a session setup request message, which includes a request to Application Enabler client 203 to send a first report to enabler server when a first condition occurs like QoE degradation indication, UE mobility change (which is the criteria for triggering for application to service profile adaptation). The Application Enabler client 203 then may provide a session setup response/result message (ACK/NACK).

Continuing on FIG. 4B, at Step 7 the UE 205 registers with the network and URSP rules are configured to the UE 205 by the PCF 213 (see block 417). In various embodiments, the registration and URSP rule configuration occurs as described in 3GPP TS 23.501 and TS 23.503. Note, however, that separate URSP rules would be needed for each subscribed S-NSSAI, where the Rule Precedence will define the URSP rule priorities (URSP Rule 1>URSP Rule 2) to help associating the application with the slice, as discussed above.

At Step 8, a trigger event is captured at the application layer. Two options are possible, shown in Step 8*a* and Step 8*b*.

For Step 8*a*, the Application Enabler client 203 identifies that the App #A client 202 needs to adapt the application-to-service-profile mapping (see messaging 419). For example, the Application Enabler client 203 may identify this need by monitoring the QoE measurements or by checking the location of the UE (from app client, or LM client). The Application Enabler client 203 sends a trigger event report (based on the configuration from the enabler server (e.g., QoE metric <X %) which provides information on one or more of the following:

UE IDs (GPSI, group ID)
    Application ID
    FFAE-S/VAE-S ID (i.e., identified by FQDN)
    New service profile ID
    New service requirements
    QoE degradation notification
    UE mobility change notification
    Degradation of Application QoS attributes (reliability, latency, jitter, . . . )

At Step 8b, the Application Enabler server 223 receives from the app server a request to adapt the application requirements (see messaging 421). This request can comprise one or more of the following actions:

Change of the automation level of the application
    Change of the communication model
    Change of the service profile/requirements which are mapped to the application
    Change of the service area coverage for the application
    Change of QoE targets At Step 9, the Application Enabler server 223 determines the re-mapping of App #A to slice #2 (see block 423). This mapping is based on the updated application requirements (as of step 6a/6b), the per-UE slice subscriptions (for all UEs running App #A), slice capabilities and availability (based on network slice monitoring), the GST parameters from Step 0.

At Step 10a, the Application Enabler server 223 sends the updated Application-to-Slice mapping to the UDM/UDR 215 (see messaging 425). The UDM/UDR 215 translates the per-application new slice request, to the per-UE change of slice (e.g., UEs #1, #2 of #App 1, need to be remapped from Slice #1 to Slice #2). Alternatively, the UDR 215 may store such mapping information (e.g., in Application Data related storage in the UDR 215) so that the mapping is valid for all UEs using this application and slice. The message from Application Enabler server 223 to UDM/UDR 215 includes the App ID, UE IDs, old Slice ID, new Slice ID, slice access parameters, time and area of validity.

At Step 10b, based on this updated mapping, the UDR 215 notifies the PCF 213 about the changed policy of mapping of application to slice (see messaging 427). At Step 10c, the PCF 213 generates updated URSP rules and provides the updated URSP rules to the UE 205 via N1 signaling (see messaging 429). At Step 10d, the UE 205 updates the URSP rules and based on the new URSP rules the UE 205 may decide to trigger a new Registration procedure to register to the new network slice (S-NSSAI #2), if not registered yet, and to establish a new PDU Session to this network slice (see block 431).

The solution depicted in FIG. 4A-4B is beneficial in case where a single application App #A should be mapped on a new Slice #2, but other applications would continue to use Slice #1. Note that while the above description of the solution and the embodiments are provided for application-to-slice mapping, but this is not limited to network slicing but also applies to Application-to-DNN mapping too. In such embodiments, the Application Enabler server 223 may remap App #A from a first DNN to a second DNN and send the updated mapping to the Application Enabler client 203.

Figure 5A:
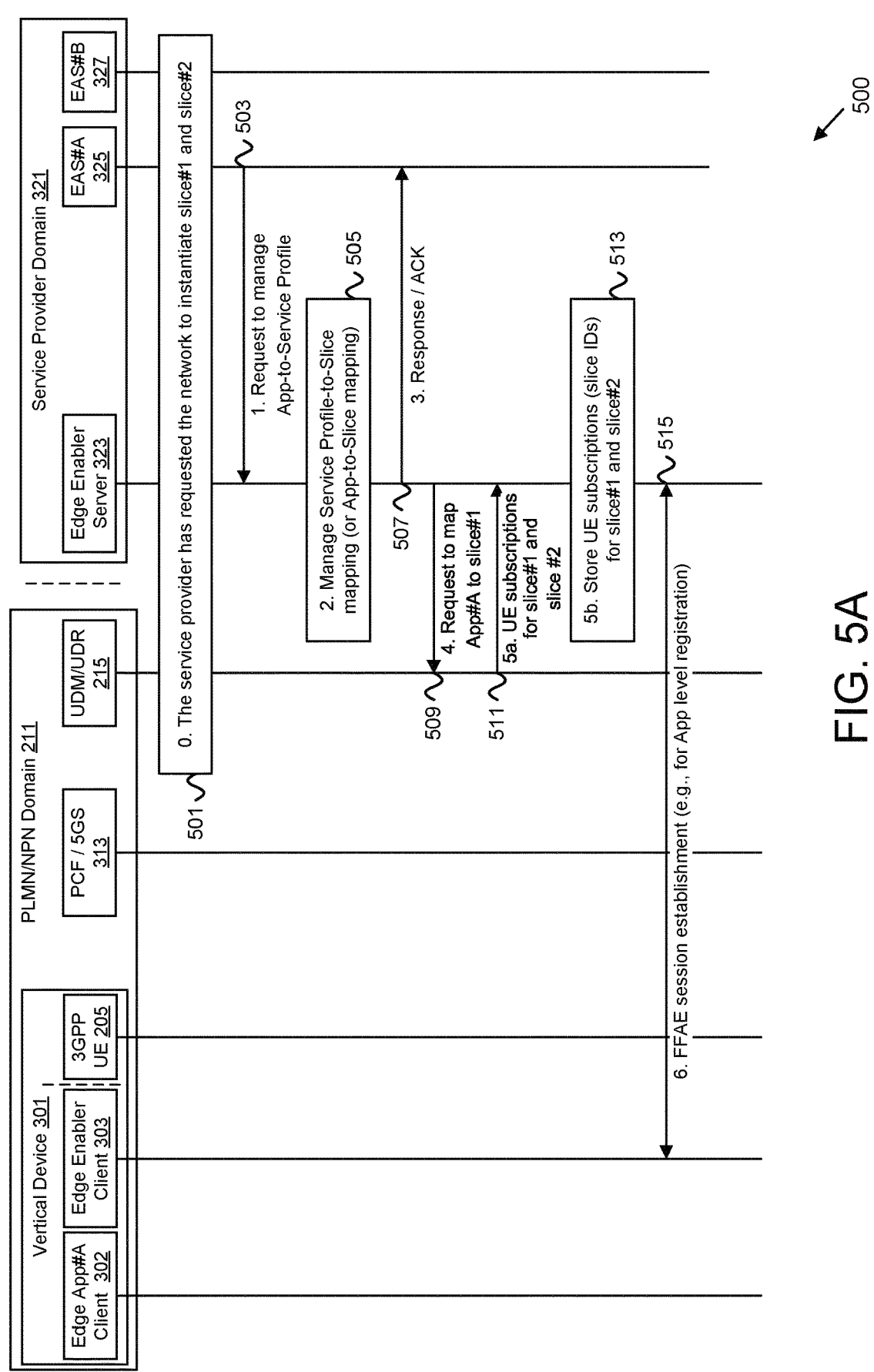
FIG. 5A is a diagram illustrating signaling flow for one embodiment of a procedure for application-triggered and network-enabled slice and/or DNN re-mapping for edge data network deployment.
Figure 5B:
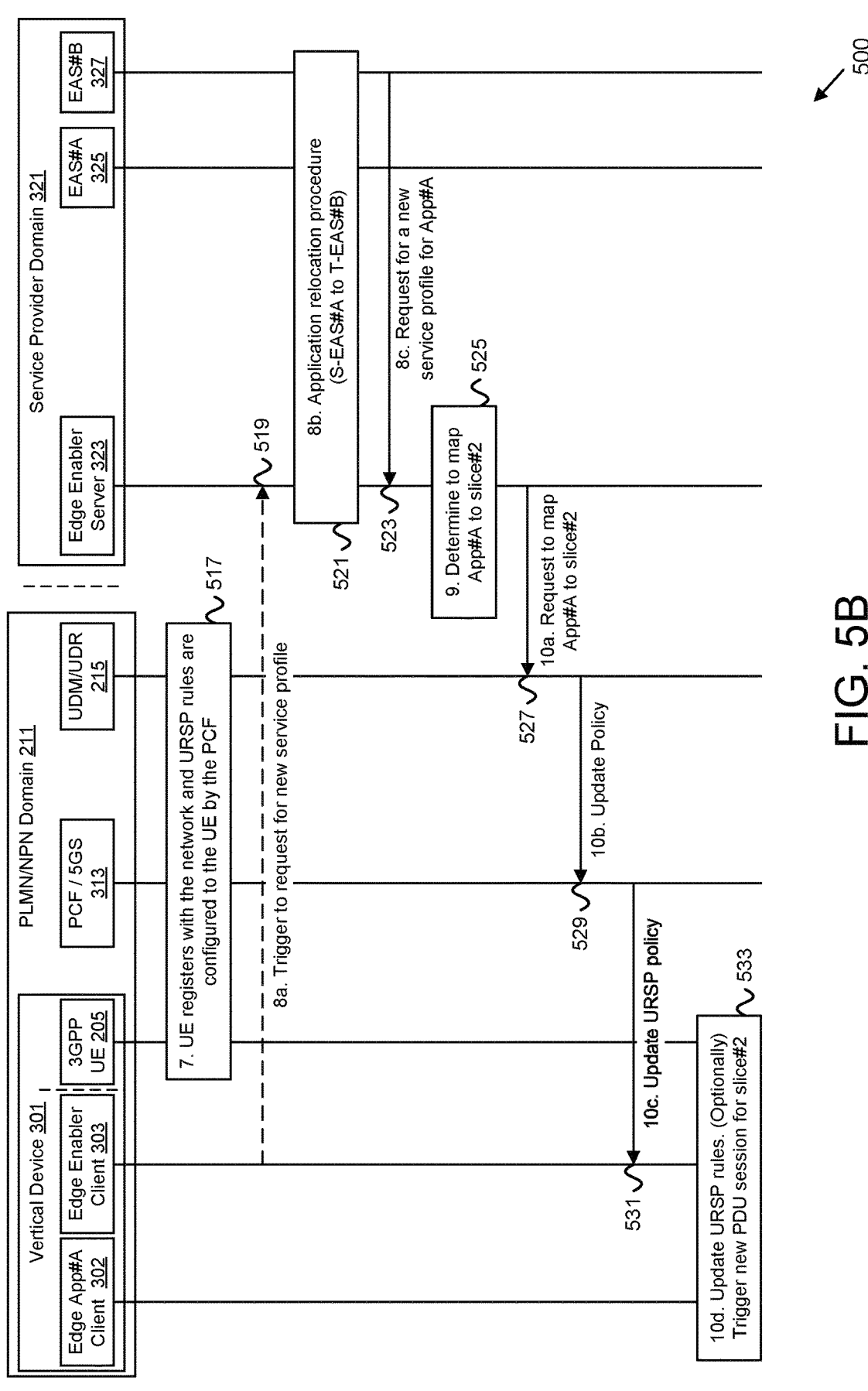
FIG. 5B is a continuation of the procedure in FIG. 5A.

FIGS. 5A-5B depict a procedure 500 for application-triggered and network-enabled slice and/or DNN re-mapping for edge data network deployment, according to embodiments of the disclosure. The procedure 500 involves the vertical device 301 comprising the edge application client 302 for the first application (referred to as "App #A"), the Edge Enabler client 303 and the UE 205. The procedure 500 also involves the PCF 213 and UDM/UDR 215 in the PLMN (or NPN) domain 211, as well as the Edge Enabler server 323, the edge application server 225 for App #A (shown as "EAS #A" 325) and the edge application server 227 for a second application (shown as "EAS #B" 327).

This embodiment provides a solution for the configuration of the initial application to slice mapping, as well as the adaptation of the mapping when a trigger event is sent by the application layer for the scenario of edge applications. The scenario is that the vertical device 301 is moving to an area where application needs to be re-located to a different Edge Application Server area, where the service profiles may not be fulfilled. In this situation, the Edge Enabler server 323 needs to have the capability to update the application to slice mapping, in order to ensure that the application QoS requirements are met.

This embodiment handles the slice re-mapping at the Edge Enabler server 323 via interacting with the network to capture the re-mapping which is handled at the network side per each vertical device 301 by adapting the UE subscription/URSP rules. In particular, this is done via passing UE subscriptions per-application from UDM/UDR 215 to Application Enabler server 223, and request to change slice for application from Application Enabler server 223 to PCF 213 signaling, indirectly by updating URSP rules at UE 205 and triggering slice re-selection.

Turning to FIG. 5A, at Step 0, as a first precondition, the service provider has requested the network to instantiate slice #1 and slice #2 (see block 501). The slice instantiation is performed at the Management domain. Slice information, such as GST parameters are also sent to the Edge Enabler layer by the Management domain at this point.

At Step 1, the Edge App Server #A 325 sends to Edge Enabler server 323 a request for managing the application to slice mapping (see messaging 503). This request includes one or more of the following parameters:

Application ID
    Transaction ID
    Service profile(s) and ID(s)
    Service requirements
    PLMN ID and/or NPN ID
    Application-to-EDN/LAND mapping
    Application configuration and/or context parameters
    Enforcement flag (whether the EE-S has the permission to enforce or just recommend a change)
    UE IDs (GPSI, external ID, group ID) within the application
    Area of validity (cell IDs, TA ID) and time of validity At Step 2, the Edge Enabler server 323 determines the mapping of App #A to slice #1 (see block 505). This mapping is based on the service profile/parameters, the per-UE slice subscriptions (for all UEs running App #A), slice capabilities and availability (based on network slice monitoring), the GST parameters from Step 0.

At Step 3, the Edge Enabler server 323 provides a response (i.e., ACK) to the App Server #A 225, as acknowledgement for undertaking the management of the Application-to-Slice mapping (see messaging 507).

At Step 4, the Edge Enabler server 323 sends the App #A-to-slice #1 mapping to the UDM/UDR 215 and also requests the UE subscriptions related to App #A (e.g., to which slices they are allowed to connect, see messaging 509). The UDM 215 translates the per-application slice request, to the per-UE slice polices based on the stored subscriptions at the UDR 215 (e.g., UEs #1, #2 of App #1, are mapped from Slice #1). This message includes the App ID, UE IDs, old Slice ID, new Slice ID, slice access parameters, and time and area of validity.

At Step 5a, the UDM 215 provides all the UE subscriptions for App #A to the Edge Enabler server 323, in order to allow the enabler server to know which are the allowable mappings for the App #A (see messaging 511). At Step 5b, the Edge Enabler server 323 stores UE subscriptions (slice IDs) for slice #1 and slice #2 (see block 513).

At Step 6, the Edge Enabler server 323 establishes an EE session (see messaging 515). In particular, the Edge Enabler server 323 sends to one or more clients, a session setup request message, which includes a request to Edge Enabler client 303 to send a first report to enabler server when a first condition occurs like QoE degradation indication, UE mobility change (which is the criteria for triggering for application to service profile adaptation). The Edge Enabler client 303 then may provide a session setup response/result message (ACK/NACK).

Continuing at FIG. 5B, at Step 7 the UE 205 registers with the network and URSP rules are configured to the UE 205 by the PCF 213 (see block 517). In various embodiments, the registration and URSP rule configuration occurs, e.g., as described in 3GPP TS 23.501 and TS 23.503. Note, however, that separate URSP rules would be needed for each subscribed S-NSSAI, where the Rule Precedence will define the URSP rule priorities (URSP Rule 1>URSP Rule 2) to help associating the application with the slice, as discussed above.

At Step 8a (optional), a trigger event is captured at the application layer. The Edge Enabler client 303 identifies that the application needs to perform application relocation to different Edge Application Server (e.g., EAS #B 327), by monitoring the QoE measurements or by checking the location of the vertical device 301 (from app client, or LM client). The Edge Enabler client 303 sends a trigger event (see messaging 519), which provides information on:

UE IDs (GPSI, group ID)
Application ID
EE-S ID (i.e., identified by FQDN)
New service profile ID
New service requirements
Trigger to change from EAS #A to EAS #B service area
Degradation of Application QoS attributes (reliability, latency, jitter, . . . )

At Step 8b, based on the trigger event from Edge Enabler client 303 (or based on EAS-triggered application relocation trigger), the Edge Enabler server 323 determines that an application re-location is needed from Edge App Server #A 325 to Edge App Server #B 327 (see block 521). One example of application re-location is provided at 3GPP TR 23.758 (Solutions #9, #16, #21) and 3GPP TS 23.558, clause 8.8.

At Step 8c, the target EAS (i.e., Edge Application Server #B 327) sends a request to Edge Enabler server 323 to adapt the application requirements. This request can comprise one or more of the following actions:

Change of the automation level of the application
Change of the communication model
Change of the service profile/requirements which are mapped to the application
Change of QoE targets At Step 9, the Edge Enabler server 323 determines the re-mapping of App #A to slice #2 (see block 525). This mapping is based on the updated application requirements (as of step 8a/8b/8c), the per-UE slice subscriptions (for all UEs running App #A), slice capabilities and availability (based on network slice monitoring), the GST parameters from Step 0.

At Step 10a, the Edge Enabler server 323 sends the updated Application-to-Slice mapping to the UDM/UDR 215 (see messaging 527). The UDM/UDR 215 translates the per-application new slice request, to the per-UE change of slice (e.g., UEs #1, #2 of #App 1, need to be remapped from Slice #1 to Slice #2). Alternatively, the UDR 215 may store such mapping information (e.g., in Application Data related storage in the UDR 215) so that the mapping is valid for all UEs using this application and slice. The message from Edge Enabler server 323 to UDM/UDR 215 includes the App ID, UE IDs, old Slice ID, new Slice ID, slice access parameters, time and area of validity.

At Step 10b, based on this updated mapping, the UDR 215 notifies the PCF 213 about the changed policy of mapping of application to slice (see messaging 529). At Step 10c, the PCF 213 generates updated URSP rules and provides the updated URSP rules to the UE 205 via N1 signaling (see messaging 531). At Step 10d, the UE 205 updates the URSP rules and based on the new URSP rules the UE 205 may decide to trigger a new Registration procedure to register to the new network slice (S-NSSAI #2), if not registered yet, and to establish a new PDU Session to this network slice (see block 533).

Note that while the above description of the solution and the embodiments are provided for application-to-slice mapping, but this is not limited to network slicing but also applies to Application-to-DNN mapping too. In such embodiments, the Edge Enabler server 323 may remap App #A from a first DNN to a second DNN and send the updated mapping to the Edge Enabler client 303.

Figure 6:
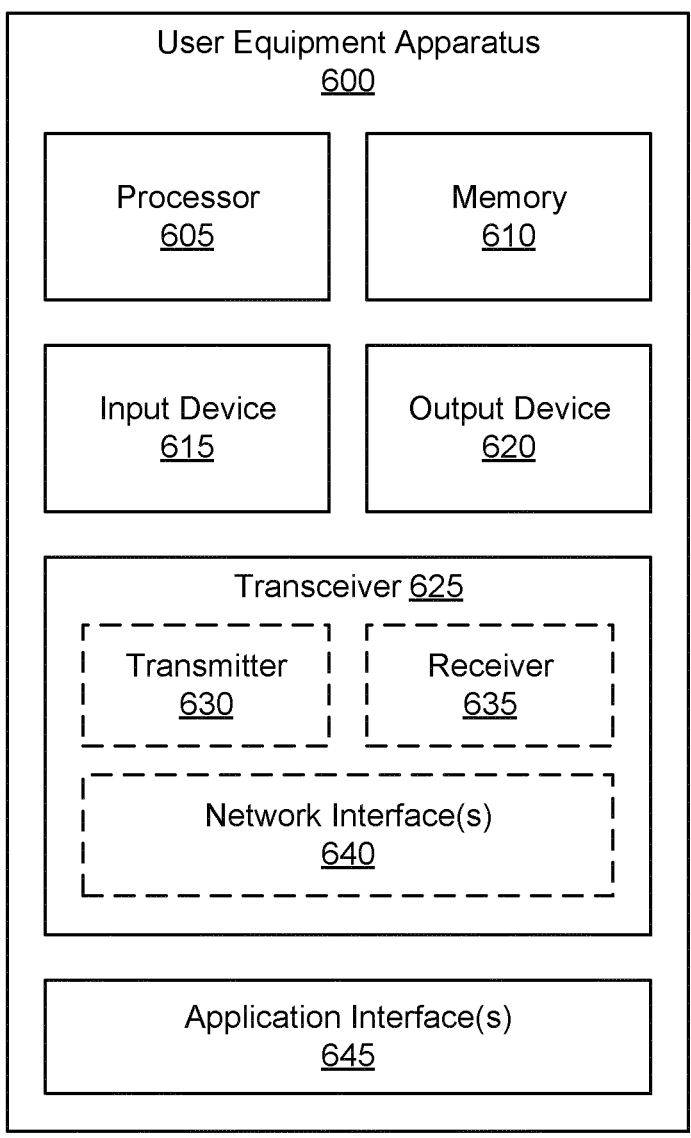
FIG. 6 is a diagram illustrating one embodiment of a user equipment apparatus that may be used for network profile re-mapping for an application supporting one or more UEs.

FIG. 6 depicts a user equipment apparatus 600 that may be used for network profile re-mapping, according to embodiments of the disclosure. In various embodiments, the user equipment apparatus 600 is used to implement one or more of the solutions described above. The user equipment apparatus 600 may be implemented in a vertical device, such as the FF device 101 (containing the remote unit 105 and FFAE-C 155), the vehicle 161 (containing the remote unit 105 and VAE-C 165), the remote unit 105 (e.g., as depicted in FIG. 1C and containing the EEC 175), the vertical device 201 (containing the UE 205 and the application enabler client 203), and/or the vertical device 301 (containing the UE 205 and the edge enabler client 303), described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640. In some embodiments, the transceiver 625 supports a first interface (e.g., Uu interface) for communicating with one or more base units in a RAN, a second interface (e.g., N1 interface) for communicating with a AMF, and a third interface for communicating with a TSN system.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

The user equipment apparatus 600 supports one or more application interfaces 645. Each application interface 645 supports communication among application instances running on the user equipment apparatus 600 and/or supports communication with an external application instance, e.g., running on a network device or a UE. In some embodiments, the application interface(s) 645 include a set of functions and procedures that allow for applications running on the user equipment apparatus 600 to access data and features of other applications, services or operating systems. As described in further detail below, a FFAE client running on the user equipment apparatus 600 may use an application interface 645 to communicate with a FFAE server. As another example, a TSN application running on the user equipment apparatus 600 may use an application interface 645 to communicate with a TSN application server.

In various embodiments, the processor 605 controls the user equipment apparatus 600 to implement the above described UE behaviors. In some embodiments, the processor 605 provides an application enabler client, which performed the above described AEC behaviors. In further embodiments, the processor 605 may support at least one application, such as a V2X application, a FF application client, an requirement from one or more V2X applications. In some embodiments, the one or more V2X applications includes a V2X application server and/or a VAE server.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to network profile re-mapping. For example, the memory 610 may store service requirements, QoS requirements, QoE requirements, mappings, application requirements, related parameters, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

In various embodiments, the transceiver 625 is configured to communicate with 3GPP access network(s) and/or the non-3GPP access network(s). In some embodiments, the transceiver 625 implements modem functionality for the 3GPP access network(s) and/or the non-3GPP access network(s). In one embodiment, the transceiver 625 implements multiple logical transceivers using different communication protocols or protocol stacks, while using common physical hardware.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

The transceiver 625 may include one or more transmitters 630 and one or more receivers 635. Although a specific number of transmitters 630 and receivers 635 are illustrated, the user equipment apparatus 600 may have any suitable number of transmitters 630 and receivers 635. Further, the transmitter(s) 630 and the receiver(s) 635 may be any suitable type of transmitters and receivers. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module. In certain embodiments, the transceiver 625 may implement a 3GPP modem (e.g., for communicating via NR or LTE access networks) and a non-3GPP modem (e.g., for communicating via Wi-Fi or other non-3GPP access networks).

Figure 7:
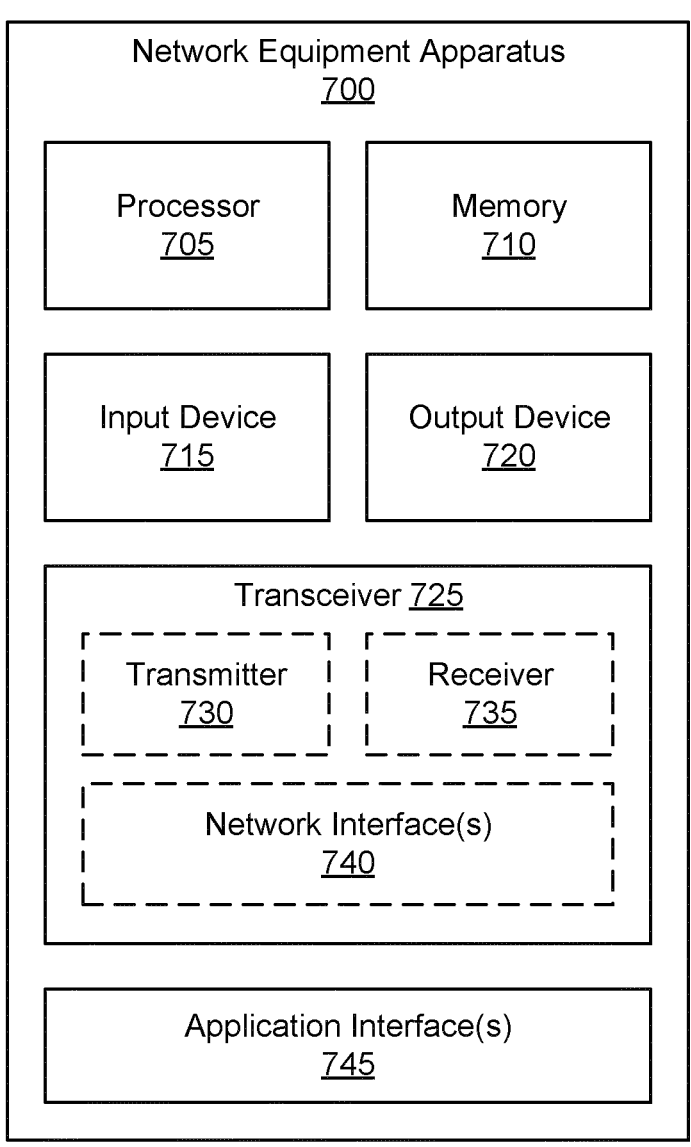
FIG. 7 is a diagram illustrating one embodiment of a network equipment apparatus that may be used for network profile re-mapping for an application supporting one or more UEs.

FIG. 7 depicts one embodiment of a network equipment apparatus 700 that may be used for network profile re-mapping, according to embodiments of the disclosure. In some embodiments, the network equipment apparatus 700 may be one embodiment of a application enabler server, such as FFAE-S 153, VAE-S 163, EES 173, Application Enabler Server 223, and/or Edge Enabler Server 323. Furthermore, network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740, such as the N1, N2, and N3 interfaces. In some embodiments, the transceiver 725 supports a first interface for communicating with one or more network functions in a mobile core network (e.g., a 5GC and/or EPC), a second interface for communicating with a TSN system, and a third interface for communicating with a remote unit (e.g., UE).

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor

705 executes instructions stored in the memory 710 to perform the methods and routines described herein. The processor 705 is communicatively coupled to the memory 710, the input device 715, the output device 720, and the transceiver 725.

The network equipment apparatus 700 supports one or more application interfaces 745. Each application interface 745 supports communication among application instances running on the user equipment apparatus 700 and/or supports communication with an external application instance, e.g., running on a network device or a UE. In some embodiments, the application interface(s) 745 include a set of functions and procedures that allow for applications running on the network equipment apparatus 700 to access data and features of other applications, services or operating systems. As described in further detail below, a FFAE client running on the network equipment apparatus 700 may use an application interface 745 to communicate with a FFAE server. As another example, a TSN application running on the network equipment apparatus 700 may use an application interface 745 to communicate with a TSN application server.

In various embodiments, the processor 705 controls the user equipment apparatus 700 to implement the above described application enabler server behaviors. For example, the network equipment apparatus 700 may act as a FFAE-S 153, a VAE-S 163, an EES 173, the Application Enabler Server 223, and/or the Edge Enabler Server 323. In some embodiments, the processor 705 configures a first mapping of a first application based on at least one application requirement of the first application. Here, the first mapping associates (e.g., maps) the first application to a first network profile. In one embodiment, the network profile indicates a network slice. In another embodiment, the network profile indicates a DNN. In other embodiments, the network profile indicates both a network slice and a DNN.

In some embodiments, the at least one application requirement is obtained from the first application. In certain embodiments, the first application comprises an application server and/or one or more application clients at one or more UEs. In some embodiments, the at least one application requirement indicates one or more of: a QoE requirement, a QoS requirement, a UE mobility requirement, a service profile requirement, a service operation requirement, and an application re-location requirement to a new data network (e.g., edge data network or regional data network).

The processor 705 receives a trigger event report (e.g., via an application interface 745) from the first application for adapting the at least one application requirement for at least one UE using the first application. In some embodiments, the trigger event report contains one or more of the following parameters: a new service requirement, a QoE degradation notification, a UE mobility change notification, a degradation of Application QoS attributes (e.g., reliability, latency, jitter, etc.), a change of Application-to-DNN mapping, a change of the automation level of the application, a change of the communication model, a change of the service profile or service requirements which are mapped to the application, a change of the service area coverage for the application, a change of QoE targets, a change of edge application server service area, a change of Application-to-EDN mapping, and at least one UE ID (e.g., GPSI, group ID), Application ID, FFAE-S ID, VAE-S ID, EES ID (e.g., defined by a FQDN), New service profile ID.

The processor 705 determines, based on the trigger event report, a second mapping of the first application to a second network profile. In some embodiments, the second mapping is based on the at least one application requirement obtained from the first application. In some embodiments, the second mapping of the first application contains one or more of the following parameters: a first application ID, an application client IDs, one or more UE IDs (e.g., GPSI, external ID), an old slice ID (e.g., S-NSSAI/NSSAI), a target slice ID (e.g., S-NSSAI/NSSAI), an old DNN, a new DNN, a configured S-NSSAI for target slice, a slice-related parameter update (e.g., update of network slice RAT/Frequency preferences, slice priority updates), and an Area of validity (e.g., defined by cell IDs and/or tracking area ("TA") ID) and Time of validity.

The processor 705 transmits (e.g., via the application interface 745 and/or a transceiver 725/network interface 740) the second mapping of the first application to the at least one UE of the first application. In some embodiments, the second mapping of the first application is transmitted to the first application of the user equipment and/or to a network function in the 5GS (e.g., the PCF and/or the AMF). In certain embodiments, the second mapping to the second network profile triggers a user equipment subscription update for a UE for which the second mapping to the second slice is not enclosed at the S-NSSAI list.

In some embodiments, prior to configuring the first mapping, the processor 705 further receives (e.g., via the application interface 745 and/or the transceiver 725/network interface 740) an initial request for providing a network profile mapping function. In certain embodiments, the initial request contains at least one of the following parameters: an application ID, a transaction ID, a UE ID (e.g., GPSI and/or external ID), a service profile ID, a service requirement, a PLMN ID (e.g., a combination of mobile country code ("MCC") and mobile network code ("MNC")), a NPN ID, an Application-to-DNN mapping, an application registration parameter, an application context parameter, an enforcement flag, and an area of validity (e.g., cell IDs, TA ID) and time of validity.

In some embodiments, the processor 705 receives network slice-related parameters (e.g., via the application interface 745, network interface 740, and/or the transceiver 725) for the network slices supported by the at least one UE of the first application, wherein at least one of the first mapping and the second mapping is determined using the network slice related parameters. In such embodiments, said network slice related parameters may include at least one of: a network slice subscription for the at least one UE of the first application, a Subscribed S-NSSAI for the at least one UE of the first application, a network slice RAT preference and/or network slice frequency preference for the at least one UE of the first application, a network slice priority for the slice subscription, a network slice performance parameters for a network slice, and a GST parameter for the network slice.

In some embodiments, the processor 705 transmits (e.g., via application interface 745, network interface 740, and/or the transceiver 725) a request to the network function for receiving network slice related parameters prior determining the first mapping of the first application. In further embodiments, the network slice related parameters are received from at least one of a network function (e.g., UDM/UDR, PCF) and a slice management function (e.g., OAM). In certain embodiments, the network slice related parameters received from a network function (e.g., UDM/UDR, PCF) are received for each UE of the first application (e.g., UE-specific signaling). In certain embodiments, the network slice related parameters received from a slice management function are received for each network slice supported by the first application (e.g., application-specific signaling).

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to network profile re-mapping, for example storing service requirements, QoS requirements, QoE requirements, mappings, application requirements, related parameters, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more network functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

Figure 8:
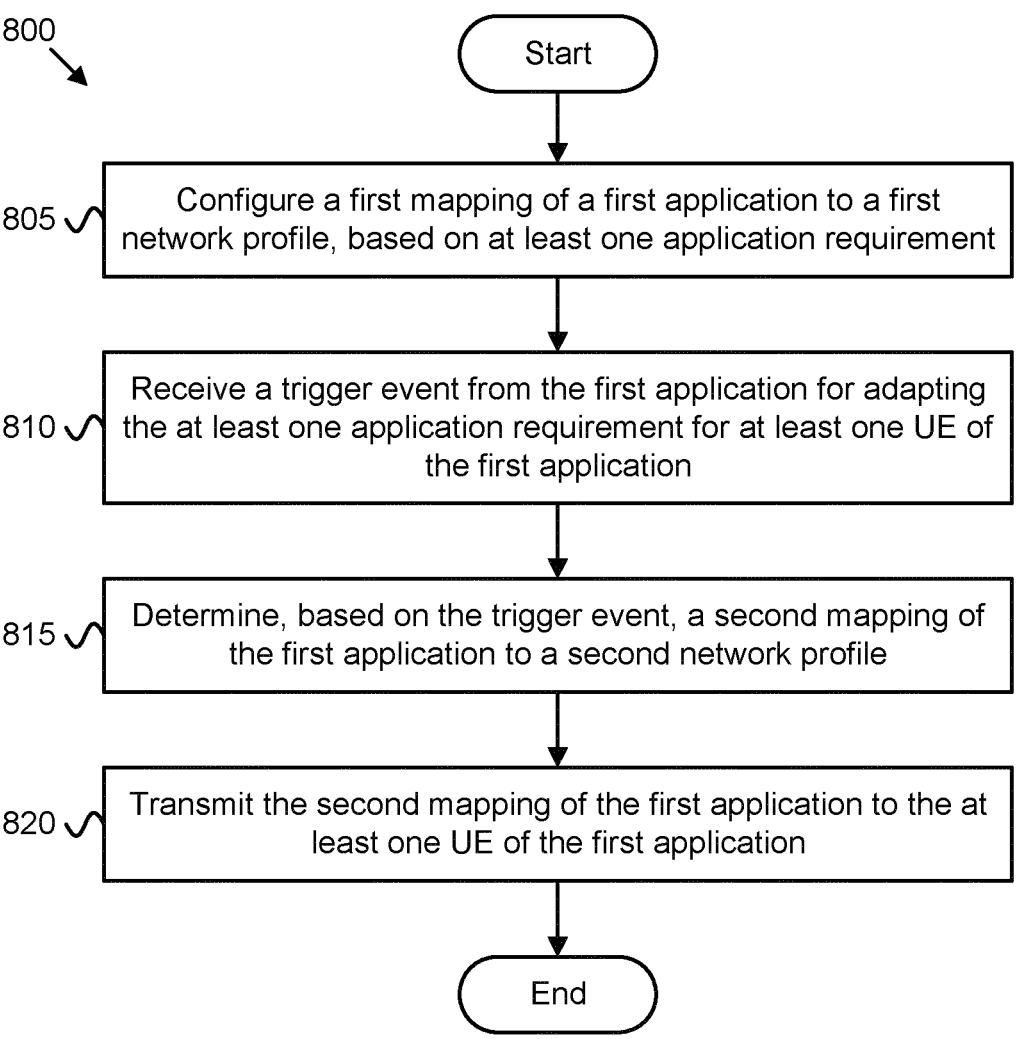
FIG. 8 is a flowchart diagram illustrating one embodiment of a method that may be used for network profile re-mapping for an application supporting one or more UEs.

FIG. 8 depicts one embodiment of a method 800 for network profile re-mapping for an application supporting one or more UEs, according to embodiments of the disclosure. In various embodiments, the method 800 is performed by an application enabler server, such as FFAE-S 153, VAE-S 163, EES 173, Application Enabler Server 223, Edge Enabler Server 323, and/or the network apparatus 700, described above. In some embodiments, the method 800 is performed by a processor, such as a microcontroller, a microprocessor, a CPU, a GPU, an auxiliary processing unit, a FPGA, or the like.

The method 800 begins and configures 805 a first mapping of a first application to a first network profile, based on at least one application requirement. The method 800 includes receiving 810 a trigger event report from the first application for adapting the at least one application requirement for at least one UE of the first application. The method 800 includes determining 815, based on the trigger event report, a second mapping of the first application to a second network profile. The method 800 includes transmitting 820 the second mapping of the first application to the at least one UE of the first application. The method 800 ends.

Disclosed herein is a first apparatus for providing network profile re-mapping for an application supporting one or more UEs, according to embodiments of the disclosure. The first apparatus may be implemented by an application enabler server, such as FFAE-S 153, VAE-S 163, EES 173, Application Enabler Server 223, Edge Enabler Server 323, and/or the network apparatus 700. The first apparatus includes a processor that configures a first mapping of a first application to a first network profile based on at least one application requirement of the first application. The processor receives a trigger event report (e.g., via an application interface) from the first application for adapting the at least one application requirement for at least one user equipment ("UE") of the first application. The processor determines, based on the trigger event report, a second mapping of the first application to a second network profile and transmits (e.g., via the application interface and/or a transceiver/network interface) the second mapping of the first application to the at least one UE of the first application.

In some embodiments, the network profile indicates at least one of a network slice and a Data Network Name ("DNN"). In some embodiments, the at least one application requirement is at least one of: a Quality of Experience ("QoE") requirement, a Quality of Service ("QoS") requirement, a UE mobility requirement, a service profile requirement, a service operation requirement, an application relocation requirement to a new data network (e.g., edge or regional).

In some embodiments, the first mapping and the second mapping are based on at least one application requirement obtained from the first application. In certain embodiments, the first application comprises an application server and/or one or more application clients at one or more UEs.

In some embodiments, the processor further receives an initial request (e.g., via the application interface and/or the transceiver/network interface) for providing a network profile mapping function prior to configuring the first mapping, wherein the initial request contains at least one of the following parameters: an application ID, a transaction ID, a UE ID (e.g., GPSI), a service profile ID, a service requirement, a public land mobile network ("PLMN") ID, a non-public network ("NPN") ID, an Application-to-DNN mapping, an application registration parameter, an application context parameter, an enforcement flag, and an area of validity (e.g., cell IDs, TA ID) and time of validity.

In some embodiments, the processor receives network slice-related parameters (e.g., via the application interface and/or the transceiver/network interface) for the network slices supported by the at least one UE of the first application, wherein at least one of the first mapping and the second mapping is determined using the network slice related parameters. In such embodiments, said network slice related parameters may include at least one of: a network slice subscription for the at least one UE of the first application, a Subscribed S-NSSAI for the at least one UE of the first application, a network slice Radio Access Technology ("RAT") preference and/or network slice frequency preference for the at least one UE of the first application, a network slice priority for the slice subscription, a network slice performance parameters for a network slice, and a Generic Slice Template ("GST") parameter for the network slice.

In further embodiments, the network slice related parameters are received from at least one of a network function (e.g., UDM/UDR, PCF) and a slice management function (e.g., OAM). In certain embodiments, the network slice related parameters received from a network function (e.g., UDM/UDR, PCF) are received for each UE of the first application (e.g., UE-specific signaling). In certain embodiments, the network slice related parameters received from a slice management function are received for each network slice supported by the first application (e.g., application-specific signaling).

In some embodiments, the processor transmits (e.g., via transceiver and/or application interface) a request to the network function for receiving network slice related parameters prior determining the first mapping of the first application.

In some embodiments, the trigger event report contains one or more of the following parameters: a new service requirement, a QoE degradation notification, a UE mobility change notification, a degradation of Application QoS attributes (e.g., reliability, latency, jitter, etc.), a change of Application-to-DNN mapping, a change of the automation level of the application, a change of the communication model, a change of the service profile or service requirements which are mapped to the application, a change of the service area coverage for the application, a change of QoE targets, a change of edge application server service area, a change of Application-to-EDN mapping, and at least one UE ID (e.g., GPSI, group ID), Application ID, FFAE-S ID, VAE-S ID, EES ID (e.g., FQDN), New service profile ID.

In some embodiments, the second mapping of the first application contains one or more of the following parameters: a first application ID, an application client IDs, one or more UE IDs (e.g., GPSI, external ID), an old slice ID (e.g., S-NSSAI/NSSAI), a target slice ID (e.g., 5-NSSAI/NSSAI), an old DNN, a new DNN, a configured S-NSSAI for target slice, a slice-related parameter update (e.g., update of network slice RAT/Frequency preferences, slice priority updates), and an Area of validity (e.g., cell IDs, TA ID) and Time of validity.

In some embodiments, the second mapping of the first application is transmitted to the first application of the user equipment and/or to a network function in the 5GS (e.g., the PCF and/or the AMF). In certain embodiments, the second mapping to the second network profile triggers a user equipment subscription update for a UE for which the second mapping to the second slice is not enclosed at the S-NSSAI list.

Disclosed herein is a first method for providing network profile re-mapping for an application supporting one or more UEs, according to embodiments of the disclosure. The first method may be performed by an application enabler server, such as FFAE-S 153, VAE-S 163, EES 173, Application Enabler Server 223, Edge Enabler Server 323, and/or the network apparatus 700. The first method includes configuring a first mapping of a first application to a first network profile, based on at least one application requirement, and receiving a trigger event report from the first application for adapting the at least one application requirement for at least one UE of the first application. The first method includes determining, based on the trigger event report, a second mapping of the first application to a second network profile and transmitting the second mapping of the first application to the at least one UE of the first application.

In some embodiments, the network profile indicates a network slice and/or a data network name ("DNN"). In some embodiments, the at least one application requirement is at least one of: a QoE requirement, a QoS requirement, a UE mobility requirement, a service profile requirement, a service operation requirement, an application re-location requirement to a new data network (e.g., edge or regional).

In some embodiments, the first mapping and the second mapping are based on at least one application requirement obtained from the first application. In such embodiments, the first application comprises an application server and/or one or more application clients at one or more UEs.

In some embodiments, the first method includes receiving an initial request for providing a network profile mapping function prior to configuring the first mapping, wherein the initial request contains at least one of the following parameters: an application ID, a transaction ID, a UE ID (e.g., GPSI), a service profile ID, a service requirement, a PLMN ID, a NPN ID, an Application-to-DNN mapping, an application registration parameter, an application context parameter, an enforcement flag, and an area of validity (e.g., cell IDs, TA ID) and time of validity.

In some embodiments, the first method includes receiving network slice related parameters for the network slices supported by the at least one UE of the first application, wherein at least one of the first mapping and the second mapping is determined using the network slice related parameters. In such embodiments, said network slice related parameters may include at least one of: a network slice subscription for the at least one UE of the first application, a Subscribed S-NSSAI for the at least one UE of the first application, a network slice RAT preference and/or network slice frequency preference for the at least one UE of the first application, a network slice priority for the slice subscription, a network slice performance parameters for a network slice, and a GST parameter for the network slice.

In further embodiments, the network slice related parameters may be received from at least one of a network function (e.g., UDM/UDR, PCF) and a slice management function (e.g., OAM). In certain embodiments, the network slice related parameters received from a network function (e.g., from UDM/UDR, PCF) are received for each UE of the first application (e.g., UE-specific signaling). In certain embodiments, the network slice related parameters received by a slice management function are received for each network slice supported by the first application (e.g., application-specific signaling).

In some embodiments, the first method further includes transmitting a request to the network function for receiving network slice related parameters prior determining the first mapping of the first application. In some embodiments, the trigger event report contains one or more of the following parameters: a new service requirement, a QoE degradation notification, a UE mobility change notification, a degradation of Application QoS attributes (e.g., reliability, latency, jitter, . . . ), a change of Application-to-DNN mapping, a change of the automation level of the application, a change of the communication model, a change of the service profile or service requirements which are mapped to the application, a change of the service area coverage for the application, a change of QoE targets, a change of edge application server service area, a change of Application-to-EDN (edge data network) mapping, and at least one UE ID (e.g., GPSI, group ID), Application ID, FFAE-S ID, VAE-S ID, EES ID (e.g., FQDN), New service profile ID.

In some embodiments, the second mapping of the first application contains one or more of the following parameters: a first application ID, an application client IDs, one or more UE IDs (e.g., GPSI, external ID), an old slice ID (e.g., S-NSSAI/NSSAI), a target slice ID (e.g., S-NSSAI/NSSAI), an old DNN, a new DNN, a configured S-NSSAI for target slice, a slice-related parameter update (e.g., update of network slice RAT/Frequency preferences, slice priority updates), and an Area of validity (e.g., cell IDs, TA ID) and Time of validity.

In some embodiments, the second mapping of the first application is transmitted to the first application of the user equipment and/or to a network function in the 5GS (e.g., the PCF and/or the AMF). In certain embodiments, the second mapping to the second network profile triggers a user equipment subscription update for a UE for which the second mapping to the second slice is not enclosed at the S-NSSAI list.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus providing an application function, the apparatus comprising:

a memory; and a processor coupled to the memory, the processor configured to cause the application function to:

configure a first mapping of a first application to a first network slice, based on at least one application requirement, wherein the at least one application requirement comprises a requirement to re-locate to a new data network;

receive a request for network slice adaptation for at least one user equipment ("UE") associated with the first application, wherein the request comprises an identifier for the first application and further comprises a set of UE identifiers ("IDs") associated with the first application and a trigger event report;

determine, based on the trigger event report, a second mapping of the first application to a second network slice; and transmit the second mapping of the first application to the at least one UE associated with the first application or to a network function, or both, wherein the second mapping of the first application indicates a target data network.

2. The apparatus of claim 1, wherein the first mapping further indicates a first Data Network Name ("DNN") corresponding to the first application, and wherein the second mapping further indicates a second DNN corresponding to the first application.

3. The apparatus of claim 1, wherein the at least one application requirement comprises:

a Quality of Experience ("QoE") requirement,
a Quality of Service ("QoS") requirement,
a UE mobility requirement,
a service profile requirement,
a service operation requirement,
or a combination thereof.

4. The apparatus of claim 1, wherein the first mapping and the second mapping are based on at least one application requirement obtained from the first application.

5. The apparatus of claim 4, wherein the first application comprises an application server and one or more application clients at one or more UEs.

6. The apparatus of claim 1, wherein the processor is configured to cause the application function to receive an initial request for providing a network slice mapping function prior to configuring the first mapping, wherein the initial request comprises at least one of the following parameters:

an application ID,
a transaction ID,
a UE ID,
a service profile ID,
a service requirement,
a public land mobile network ("PLMN") ID,
a non-public network ("NPN") ID,
an application to Data Network Name ("DNN") mapping,
an application registration parameter,
an application context parameter,
an enforcement flag,
an area of validity,
a time of validity,
or a combination thereof.

7. The apparatus of claim 1, wherein the processor is configured to cause the application function to receive network slice related parameters for one or more network slices supported by the at least one UE associated with the first application, wherein at least one of the first mapping or the second mapping is determined using the network slice related parameters, the network slice related parameters comprising at least one of:

a network slice subscription for the at least one UE associated with the first application,
a subscribed Single Network Slice Selection Assistance Information ("S-NSSAI") for the at least one UE associated with the first application,
a network slice radio access technology ("RAT") preference for the at least one UE associated with the first application,
a network slice frequency preference for the at least one UE associated with the first application,
a network slice priority for the network slice subscription, a network slice performance parameters for a network slice,
a Generic Slice Template ("GST") parameter for the network slice,
or a combination thereof.

8. The apparatus of claim 7, wherein the network slice related parameters are received from at least one of the network function or a slice management function.

9. The apparatus of claim 8, wherein the network slice related parameters received by the network function are received for each UE associated with the first application.

10. The apparatus of claim 8, wherein the network slice related parameters are received for each network slice supported by the first application.

11. The apparatus of claim 1, wherein the processor is configured to cause the application function to transmit a request to the network function for receiving network slice related parameters prior to the apparatus determining the first mapping of the first application.

12. The apparatus of claim 1, wherein the trigger event report comprises one or more of the following parameters:

a new service requirement,
a Quality of Experience ("QoE") degradation notification,
a UE mobility change notification,
a degradation of Application Quality of Service ("QoS") attributes,
a change of Application-to-Data Network Name ("DNN") mapping,
a change of an automation level of the application,
a change of a communication model,
a change of a service profile mapped to the application,
a change of service requirements which are mapped to the application,
a change of a service area coverage for the application,
a change of QoE targets, a change of edge application server service area,
a change of Application-to-Edge Data Network ("EDN") mapping,
at least one identifier selected from:
    a UE ID,
    an Application ID,
    a Factory-of-the-Future Application Enabler Server ("FFAE-S") ID,
    a Vehicle-to-Everything Application Enabler Server ("VAE-S") ID,
    an Edge Enabler Server ("EES") ID, or
    a new service profile ID,
or a combination thereof.

13. The apparatus of claim 1, wherein the second mapping of the first application comprises one or more of the following parameters:

a first application ID,
an application client IDs,
one or more UE IDs,
an old slice ID,
a target slice ID,
an old Data Network Name ("DNN"),
a new DNN,
a configured Single Network Slice Selection Assistance Information ("S-NSSAI") for a target slice,
a slice-related parameter update,
an Area of validity,
a Time of validity,
or a combination thereof.

14. The apparatus of claim 1, wherein the second mapping to the second network slice triggers a UE subscription update for a UE for which the second mapping to the second slice is not contained in a list of Single Network Slice Selection Assistance Information ("S-NSSAI").

15. A method performed by an application function, the method comprising:

configuring a first mapping of a first application to a first network slice based on at least one application requirement of the first application, wherein the at least one application requirement comprises a requirement to re-locate to a new data network;

receiving a request for network slice adaptation for at least one user equipment ("UE") associated with the first application, wherein the request comprises an identifier for the first application and further comprises a set of UE identifiers ("IDs") associated with the first application and a trigger event report; and determining, based on the trigger event report, a second mapping of the first application to a second network slice; and transmitting the second mapping of the first application to the at least one UE associated with the first application or to a network function, or both, wherein the second mapping of the first application indicates a target data network.

16. The method of claim 15, wherein the first mapping further indicates a first Data Network Name ("DNN") corresponding to the first application, and wherein the second mapping further indicates a second DNN corresponding to the first application.

17. The method of claim 15, wherein the first mapping and the second mapping are based on at least one application requirement obtained from the first application, wherein the first application comprises an application server and one or more application clients at one or more UEs.

18. The method of claim 15, further comprising transmitting a request to the network function for receiving network slice related parameters prior determining the first mapping of the first application.

19. The method of claim 15, wherein the second mapping to the second network slice triggers a UE subscription update for a UE for which the second mapping to the second slice is not contained in a list of enclosed at the Single Network Slice Selection Assistance Information ("S-NS-SAI") list.

20. The method of claim 15, wherein the at least one application requirement comprises:

a Quality of Experience ("QoE") requirement,
a Quality of Service ("QoS") requirement,
a UE mobility requirement,
a service profile requirement,
a service operation requirement,
or a combination thereof.

* * * * *